United States Patent [19]
Washisu

[11] Patent Number: 5,245,378
[45] Date of Patent: Sep. 14, 1993

[54] IMAGE STABILIZATION DEVICE

[75] Inventor: Koichi Washisu, Tokyo, Japan

[73] Assignee: Canon Kabushiki Kaisha, Tokyo, Japan

[21] Appl. No.: 726,993

[22] Filed: Jul. 8, 1991

[30] Foreign Application Priority Data

Jul. 9, 1990 [JP] Japan ............................ 2-181167
Oct. 4, 1990 [JP] Japan ............................ 2-267457

[51] Int. Cl.⁵ .......................................... G03B 7/08
[52] U.S. Cl. ................................... 354/410; 354/430
[58] Field of Search ................ 354/410, 430, 65, 70

[56] References Cited

U.S. PATENT DOCUMENTS 5,012,270 4/1991 Sekine et al. .................... 354/430
5,060,007 10/1991 Egawa ............................. 354/430
5,107,293 4/1992 Sekine et al. .................... 354/430

Primary Examiner—Russell E. Adams
Attorney, Agent, or Firm—Robin, Blecker, Daley & Driscoll

[57] ABSTRACT

An image stabilization device having vibration detecting means for detecting the vibration state of an image, vibration correcting means responsive to the vibration detecting means to correct the vibration of the image, and control means for effecting the regulation or warning of the photographing operation until the operation of the vibration detecting means becomes stable.

47 Claims, 23 Drawing Sheets

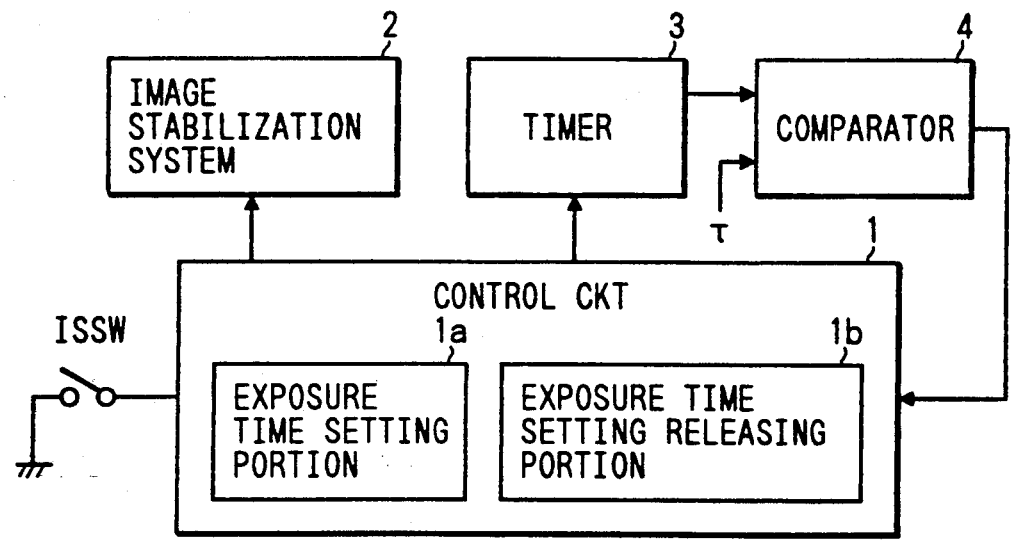
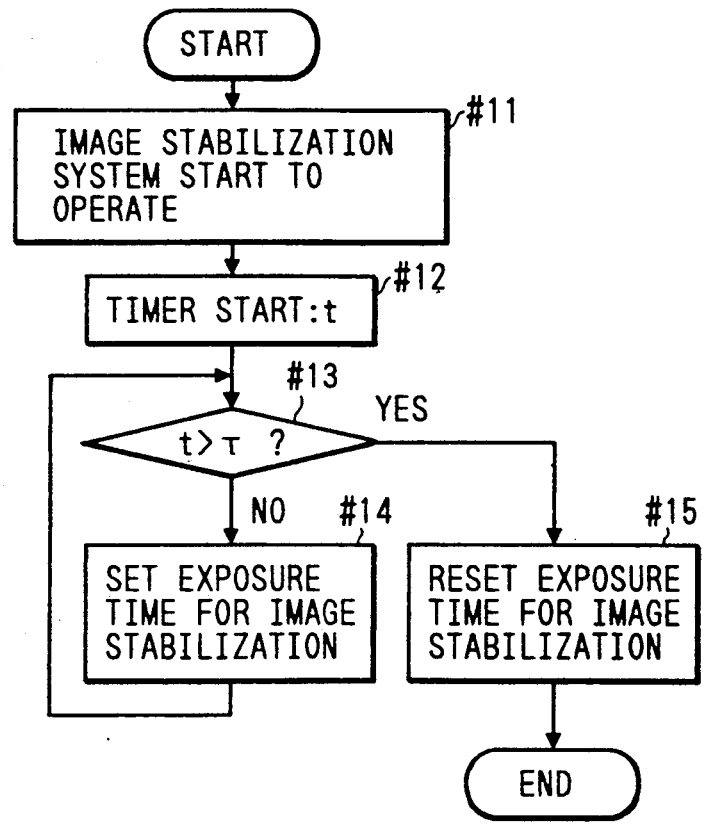

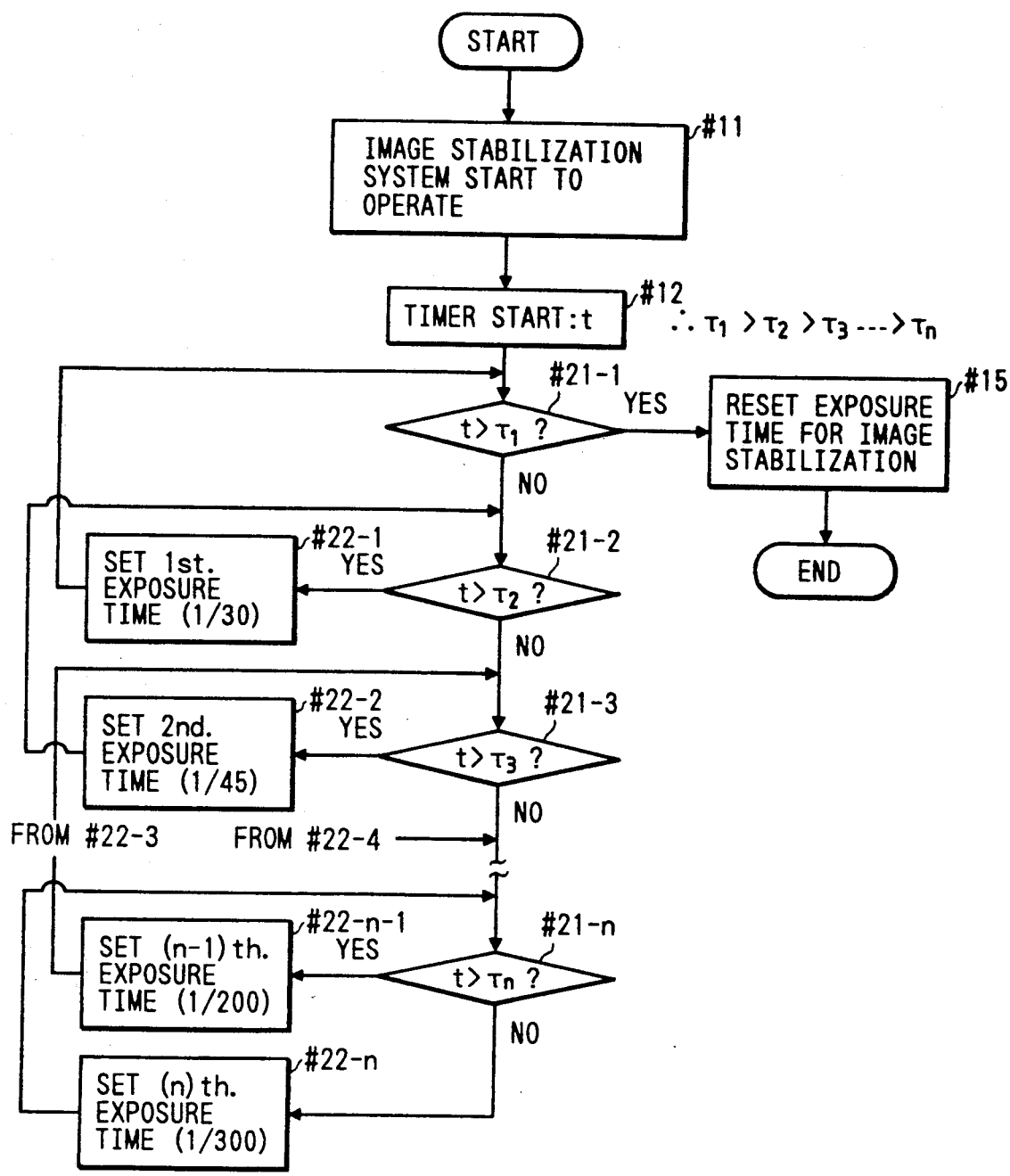

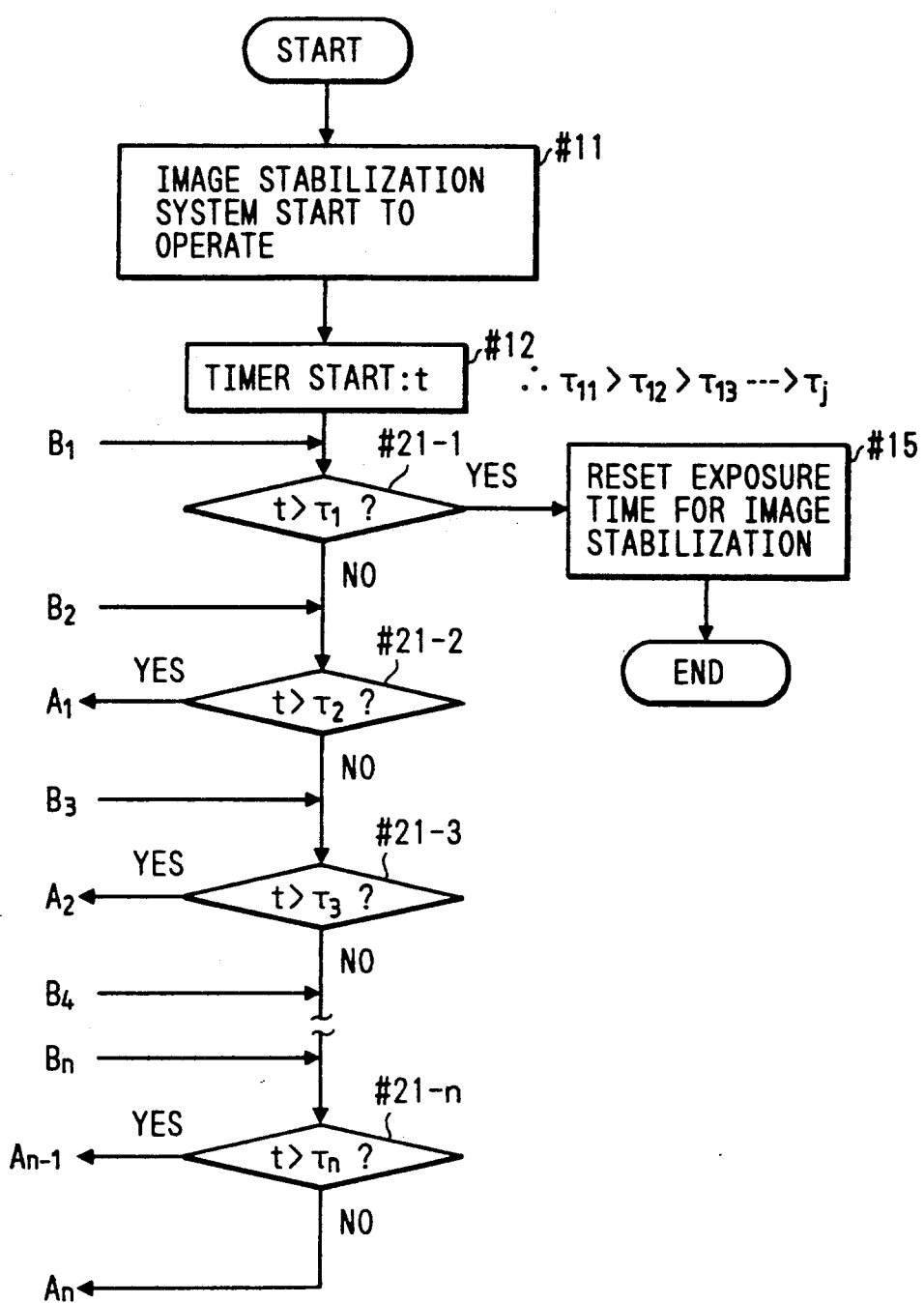

IMAGE STABILIZATION DEVICE

BACKGROUND OF THE INVENTION

1. Field of the Invention

This invention relates to improvements in an image stabilization device for use in an optical instrument such as a camera, which device is carried, for example, on a camera and detects vibration (hand vibration) of a frequency of the order of 1 HZ to 12 HZ and achieves image stabilization with the detected vibration as the information of the image blur state.

2. Related Background Art

The prior art which is the subject of the present invention will hereinafter be described.

In present-day cameras, important operations to photographing such as exposure determination and focusing are all automatized and therefore, the possibility of failing in photographing is very rarely the case even with persons unskilled in the manipulation of cameras, but only the failure in photographing by camera vibration has been difficult to prevent automatically.

So, in recent years, cameras which enable even failure in photographing attributable to such camera vibration to be prevented have been studied very actively and particularly, the development and researches of cameras which can prevent failure in photographing caused by the photographer's hand vibration have been put forward.

The hand vibration of a camera during photographing is usually vibration of a frequency of 1 HZ to 12 Hz, and as a basic idea for enabling a photograph free of image blur to be taken even when such hand vibration is caused at the point of time of shutter release, it is necessary to detect the vibration of the camera caused by the above-mentioned hand vibration, and displace a correction lens in conformity with the detected value. Accordingly, to achieve the above purpose (that is, to enable a photograph free of image blur to be taken even when the vibration of the camera is caused), it becomes necessary to detect the vibration of the camera accurately at first, and correct any variation in the optical axis caused by the hand vibration.

Theoretically speaking, the detection of this vibration (camera vibration) can be accomplished by carrying on a camera a vibration sensor for detecting angular acceleration, angular speed or the like and a camera vibration detecting system for electrically or mechanically integrating the sensor signal and outputting angular displacement. Then, a correcting optical mechanism for making the photographing optical axis eccentric on the basis of the detected information is driven to thereby suppress image blur.

Here, the outline of an image blur suppressing system (image stabilization system) using an angular speed meter will be described with reference to FIG. 22 of the accompanying drawings.

FIG. 22 shows a system for suppressing image vibration resulting from camera's vertical vibration 71p and camera's horizontal vibration 71y in the directions of arrows 71. In FIG. 22, the reference numeral 72 designates a lens barrel, and the reference characters 73p and 73y denote angular speed meters for detecting the camera's vertical vibration angular speed and the camera's horizontal vibration angular speed, respectively, and the angular speed detection directions thereof are indicated by 74p and 74y, respectively. The reference characters 75p and 75y designate conventional analog integration circuits for integrating the signals of the angular speed meters 73p and 73y, respectively, converting them into hand vibration angular displacements, driving a correcting optical system 76 (77p and 77y denote the driving portions thereof, and 78p and 78y designate correction optical position detecting sensors) by said signals, and securing stability on the image plane 79. The correcting optical mechanism itself may be endowed with a mechanical integrating function and the above-described analog integration circuits may be omitted.

In the system as described above, the angular speed meters 73p and 73y which are vibration detecting means detect the angular speeds of hand vibration, and the outputs thereof must be integrated to find a vibration displacement angle, and the correcting optical system 76 must be driven in conformity therewith.

FIG. 23A of the accompanying drawings shows a board graph of the found integration characteristic, and gain 81 has an integration characteristic (first floor integration characteristic of 20[dB/dec]) from 0.1 HZ or higher.

As previously described, hand vibration is of a frequency of the order of 1 HZ to 12 HZ and therefore, it seems that 1 HZ or higher can be integrated as an integration characteristic, but if as shown in FIG. 23B of the accompanying drawings, a characteristic that 1 HZ or higher is integrated is adopted, phase 84, if not gain 83, is not in a sufficient integration characteristic (a phase delayed by 90 [degrees] with respect to the input angular speed) in the vicinity of 1 HZ, and to attain the target of an image stabilization camera, i.e., to "prevent image vibration from occurring in the use of a 300 mm lens and a ⅛ sec. slow shutter", such a great phase delay hampers accurate image stabilization. Therefore, use is made of the characteristic of FIG. 23A in which the delay of phase 82 in the hand vibration frequency band is small and time constant is great (time constant is greater if the point of bend of the curve of gain 81 in the board graph is more toward the low frequency side).

FIG. 24 of the accompanying drawings diagramatically shows a circuit for making such a characteristic, and a resistor 87 and a capacitor 86 are negatively fed back in parallel to an operational amplifier 85. The greater the resistance value of the resistor 87 and the capacity of the capacitor 86 are made greater becomes the above-mentioned time constant.

When in FIG. 24, the signal of an angular speed meter is input to a terminal 88, a vibration displacement angle is output from a terminal 89, and as shown by the phase 82 of FIG. 23A, the accuracy of a vibration angle of 1 HZ or higher is ensured, but when use is made of a circuit having such a great time constant, the following problem arises.

The time constant being great means that a long time is required until the output becomes stable. For example, when the point of bend in FIG. 23A is at 0.1 HZ, the time constant is 1.59, and two seconds is required until the output is stabilized to some extent.

This will be graphically shown. In FIG. 25 of the accompanying drawings, relative to the center 810a of hand vibration 810 shown by a sine wave, the angular speed meter detects a hand vibration angular speed from arrow 811, and the center 812a of a waveform 812 obtained by integrating the output of the angular speed meter by an integration circuit of time constant 1.59 to find hand vibration has an error of low frequency superposed thereon. This is the error until the stabilization of the output, and if photographing is effected (from the point of time of arrow 813) when this error is arising, the amount indicated by hatching 814 within exposure time will remain as image vibration.

Accordingly, in the case of such an image stabilization system, there has been the possibility of inviting the failure that photographing is effected before the stabilization of the output and a photograph in which vibration is not corrected is taken.

SUMMARY OF THE INVENTION

The present invention has been made in view of the above-noted circumstances, and intends to provide an image stabilization device which is provided with vibration detecting means for detecting the vibration state of an image, vibration correcting means responsive to said vibration detecting means to correct the vibration of the image, and control means for effecting the regulation or warning of the photographing operation until the operation of said vibration detecting means is stabilized, and which solves the above-noted problem and eliminates the possibility of failing in photographing or missing a shutter chance.

Other objects of the present invention will become apparent from the following detailed description of some specific embodiments of the invention.

BRIEF DESCRIPTION OF THE DRAWINGS

FIG. 1 is a block diagram showing a first embodiment of the present invention.

FIG. 2 is a flow chart showing the operation of the first embodiment.

FIG. 3 is a flow chart showing the operation of a second embodiment of the present invention.

FIGS. 4A and 4B are flow charts showing the operation of a third embodiment of the present invention.

DESCRIPTION OF THE PREFERRED EMBODIMENTS

Some embodiments of the present invention will hereinafter be described with reference to the drawings.

Before the embodiments of the present invention are described, it has been described with reference to FIG. 25 that if release is effected (arrow 813) before the stabilization of the output, it will result in an unsuccessful photograph, and it can be explained from this figure that the longer the exposure time T, the greater the degree of this failure and the shorter the exposure time T, becomes the more negligible becomes the degree of this failure. Thus, if the photographer photographs at "1/30 sec., F8", it will result in an unsuccessful photograph, but if the photographer photographs at "1/125 sec., F4", failure will become almost inconspicuous.

During normal photographing, it is almost the case that several shutter speeds can be selected as described above, and if for example, the object is so dark that it can be photographed only at "1/30 sec., F4", the object can be photographed at "1/125 sec., F2.8" or the like to thereby minimize the error vibration caused by the instability of the output. In such case, an under-exposed photograph results during photographing, but in recent years, film performance has been greatly improved and even an under-exposed photograph can be sufficiently corrected by the process during development.

In first to fourth embodiments of the present invention which will hereinafter be described, attention is paid to the fact that as described above, error vibration becomes inconspicuous by a short exposure time even when the output of the image stabilization system is not stable, and at such time, an exposure time exclusively for image stabilization (such a degree of exposure time that image vibration does not weigh on the photographer's mind) is forcibly set so as to enable the photographer to be devoted to photographing without being conscious of the state of the image stabilization system (whether the output has become stable).

Figure 22:
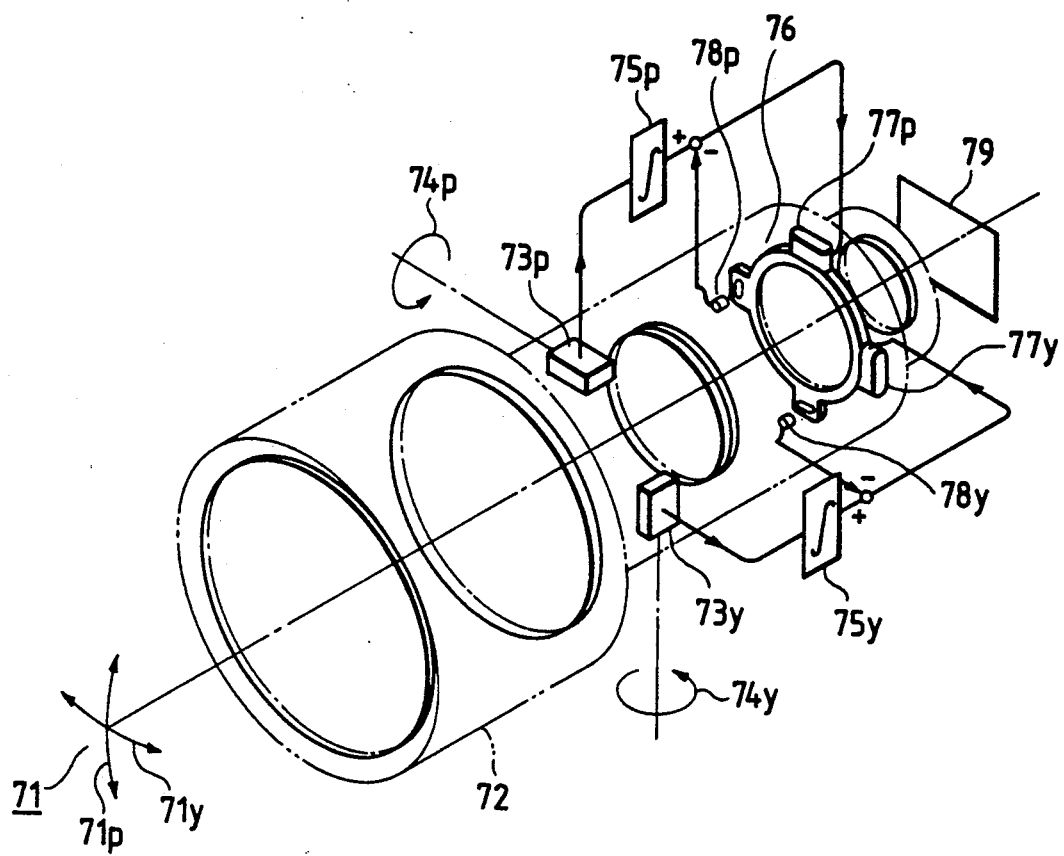
FIG. 22 is a perspective view schematically showing the construction of an image stabilization system of this kind.
Figure 23A:
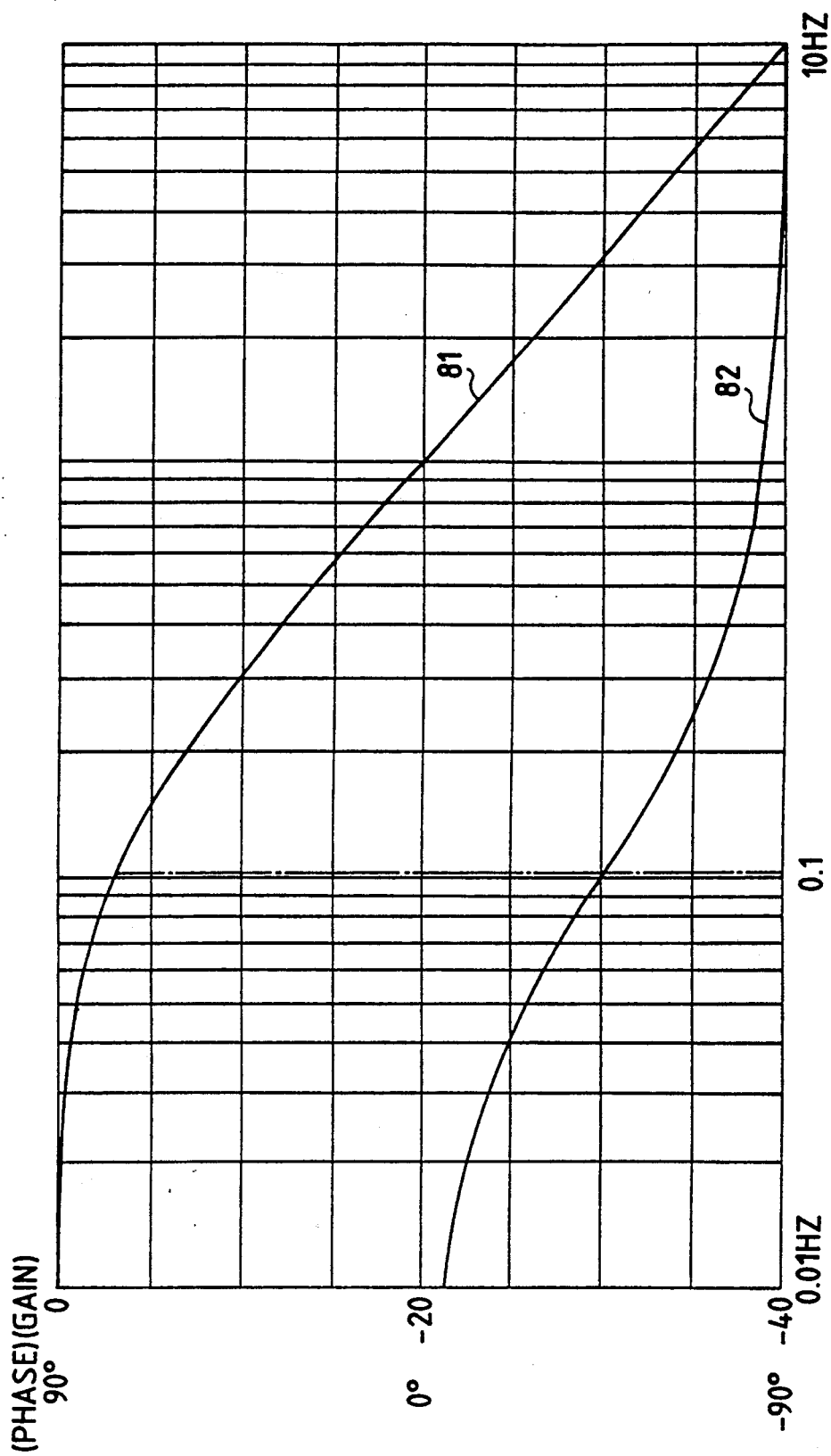
FIGS. 23A and 23B are board graphs for illustrating the integration characteristic of the integration circuit shown in FIG. 22.
Figure 23B:
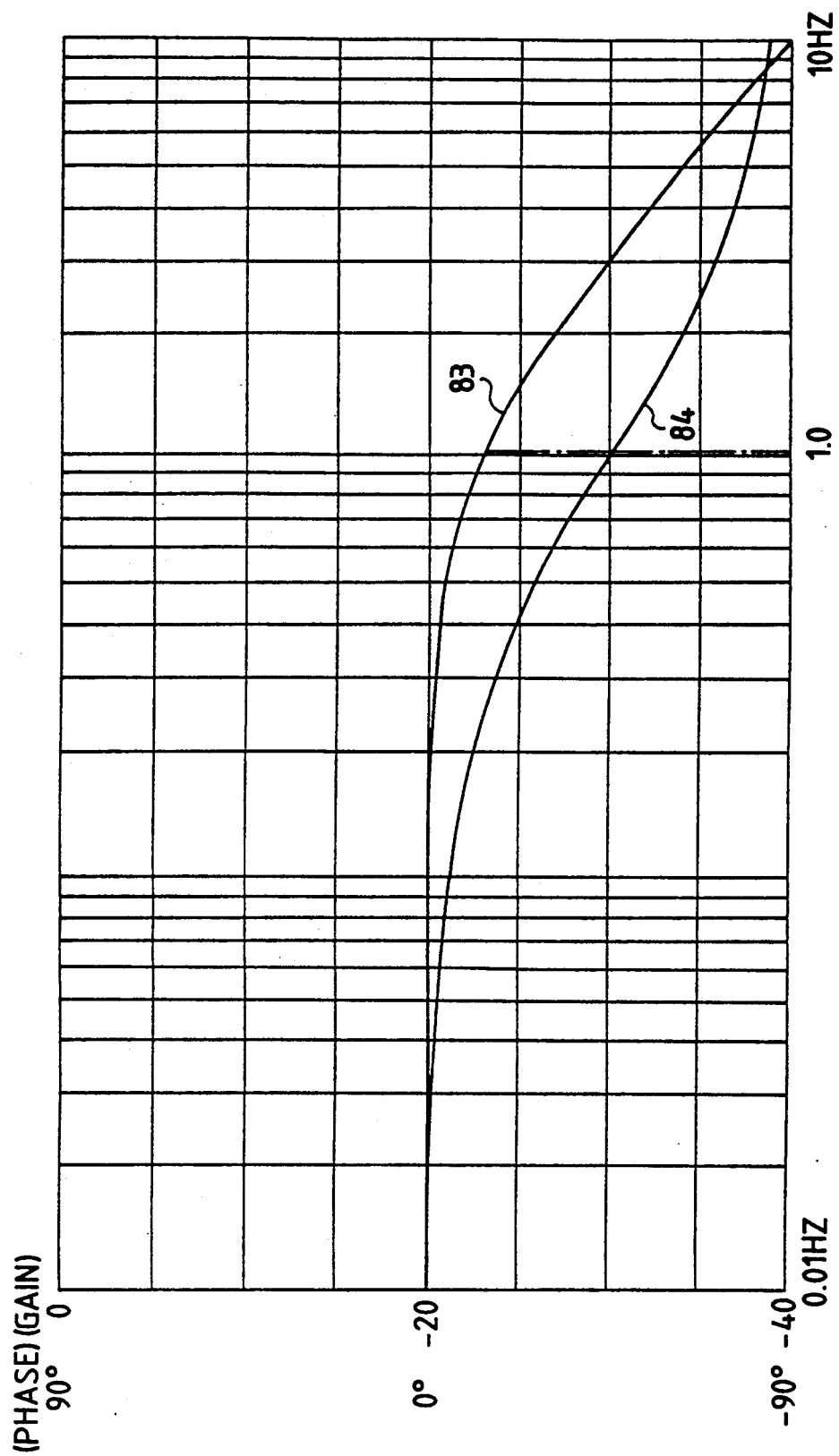
Figure 24:
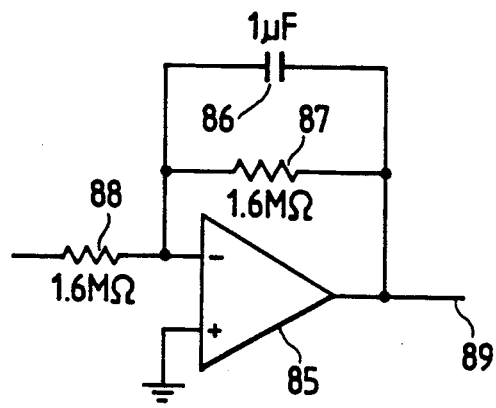
FIG. 24 is a circuit diagram showing the specific construction of an integration circuit for obtaining the integration characteristic as shown in FIG. 23A.

Referring to FIG. 1 which is a block diagram showing a camera provided with first embodiment of the present invention, the reference numeral 1 designates a control circuit comprised or computer or the like for controlling the various circuits of a camera. The control circuit 1 has therein an exposure time setting portion 1a for setting the exposure time until the output of an image stabilization system which will be described later becomes stable, and an exposure time setting portion 1b for releasing the set exposure time (e.g. 1/125 sec.) exclusively for image stabilization. The reference numeral 2 denotes an image stabilization system comprising a construction as shown in FIG. 22 for preventing the band vibration of the camera, the reference numeral 3 designates a timer for counting the time from a point of time at which the image stabilization system 2 starts to operate, the reference numeral 4 denotes a comparator for comparing a predetermined time $\tau$ for which the output of the image stabilization system 2 becomes stable (for example, a time corresponding to the time T of FIG. 25) with the time count substance t of the timer 3, and ISSW designates an image stabilization switch for starting the operation of the image stabilization system 2.

The operation of the control circuit 1 will now be described with reference to the flow chart of FIG. 2.

When the closing of the image stabilization switch ISSW is detected, at a step 11, the image stabilization system 2 is operated, and at the next step 12, the time counting operation of the timer 3 is started. Subsequently, at a step 13, the comparison between the time count substance t of the timer 3 and the prestored predetermined time $\tau$ until the stabilization of the output of the image stabilization system 2 is effected by the comparator 4, and if a signal indicating that the output of the image stabilization system 2 is not yet stabilized is input from the comparator 4 ($t \leq \tau$), advance is made to a step 14, where exposure time for image stabilization (e.g. 1/125 sec.) is set.

Also, if a signal indicating that the output of the image stabilization system 2 is stable is input from the comparator 4 ($t > \tau$), advance is made to a step 15, where the set exposure time for image stabilization is reset.

Even when photographing is effected at the above-mentioned exposure time for image stabilization, aperture is controlled in conformity with the brightness information of the object and of course, when the photographer is consciously effecting exposure correction, aperture is also controlled in conformity therewith and therefore, a photograph conforming to the photographer's intention to a certain degree and almost free of vibration can be taken.

FIG. 3 shows the operation of a second embodiment of the present invention in which the circuit construction is similar to that shown in FIG. 1.

The difference of the second embodiment from the first embodiment is that the exposure time for image stabilization is varied by the lapse time of the timer 3, i.e., in conformity with the times $\tau_2$, $\tau_3$, ..., $\tau_n$ ($\tau_1 > \tau_2 > \tau_3 > ... > \tau_n$) until the time $\tau_1$ from after the image stabilization system 2 is operated until the output thereof is stabilized is reached.

Figure 9:
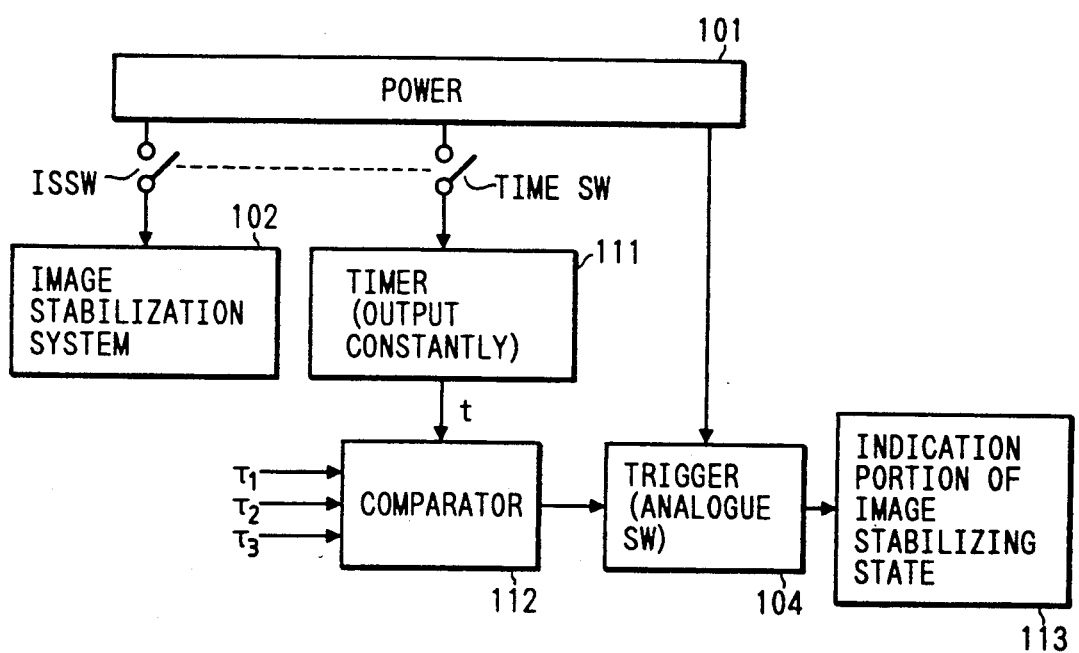
FIG. 9 is a block diagram showing a sixth embodiment of the present invention.

More particularly, in FIG. 9, when release is effected by arrow 813 after the image stabilization system has been operated, an error (hatching 814) is great, and photographing must be effected at a shutter speed "1/125 sec.". Therefore, as compared, for example, with "1/30 sec., F8" chosen by the photographer, the aperture condition differs at "1/125 sec., F4", and a difference occurs in the depth of field. However, when release is effected at a point of time later than arrow 813, the degree of instability of the output is small and therefore, even if photographing is effected not at "1/125 sec.", but at "1/60 sec.", image vibration will become inconspicuous. Accordingly, in such a case, "1/60 sec., F 5.6" is chosen and a photograph deeper in depth than "1/125 sec., F4" and approximate to the photographer's intention is intended to be realized.

In FIG. 3, portions which perform the same operations as those in FIG. 2 are given the same reference characters and the details thereof need not be described.

At a step 21-1, the time count substance t of the timer 3 is compared with a prestored predetermined time $\tau_1$, and if the result is "$t > \tau_1$", advance is made to the aforedescribed step 15, and if the result is "$t \leq \tau_1$", advance is made to a step 21-2.

At the step 21-2, the time count substance t of the timer 3 is compared with a prestored predetermined time $\tau_2$, and if the result is "$t > \tau_2$", advance is made to a step 22-1, and if the result is "$t \leq \tau_2$", advance is made to a step 21-3.

At the step 21-3, the time count substance t of the timer 3 is compared with a prestored predetermined time $\tau_3$, and if the result is "$t > \tau_3$", advance is made to a step 22-2 which will be described later, and if the result is "$t \leq \tau_3$", advance is made to a step 21-4 (not shown).

At a step 21-n, the time count substance t of the timer 3 is compared with a prestored predetermined time $\tau_n$, and if the result is "$t > \tau_n$", advance is made to a step 22-n-1 which will be described later, and if the result is "$t \leq \tau_n$", advance is made to a step 22-n.

Also, at the step 22-1, t and $\tau_1$ are in the relation that "$t > \tau_1$" and therefore, a first exposure time (e.g. 1/30 sec.) is set as the exposure time for image stabilization, and advance is made to the step 21-1.

At the step 22-2, t and $\tau_2$ are in the relation that "$t > \tau_2$" and therefore, a second exposure time (e.g. 1/45 sec.) shorter than said first exposure time is set as the exposure time for image stabilization, and advance is made to the step 21-2.

At the step 22-n-1, t and $\tau_n$ are in the relation that "$t > \tau_n$" and therefore, the (n-2)th exposure time (e.g. 1/200 sec.), not shown, is set as the exposure time for image stabilization, and advance is made to a step 21-n-2, not shown.

At the step 22-n, t and $\tau_n$ are in the relation that "$t \leq \tau_n$" and therefore, the (n)th exposure time (e.g. 1/300 sec.) is set as the exposure time for image stabilization, and advance is made to the step 21-n-1, not shown.

If as described above, the exposure time for image stabilization is set, for example, to "1/30 sec.", "1/45 sec.", ..., "1/300 sec.", photographing free of image vibration can be accomplished in a state as approximate as possible to the photographer's intention, by making the exposure time longer each time the time elapses from after the start of the operation of the image stabilization system 2.

Figure 4B:
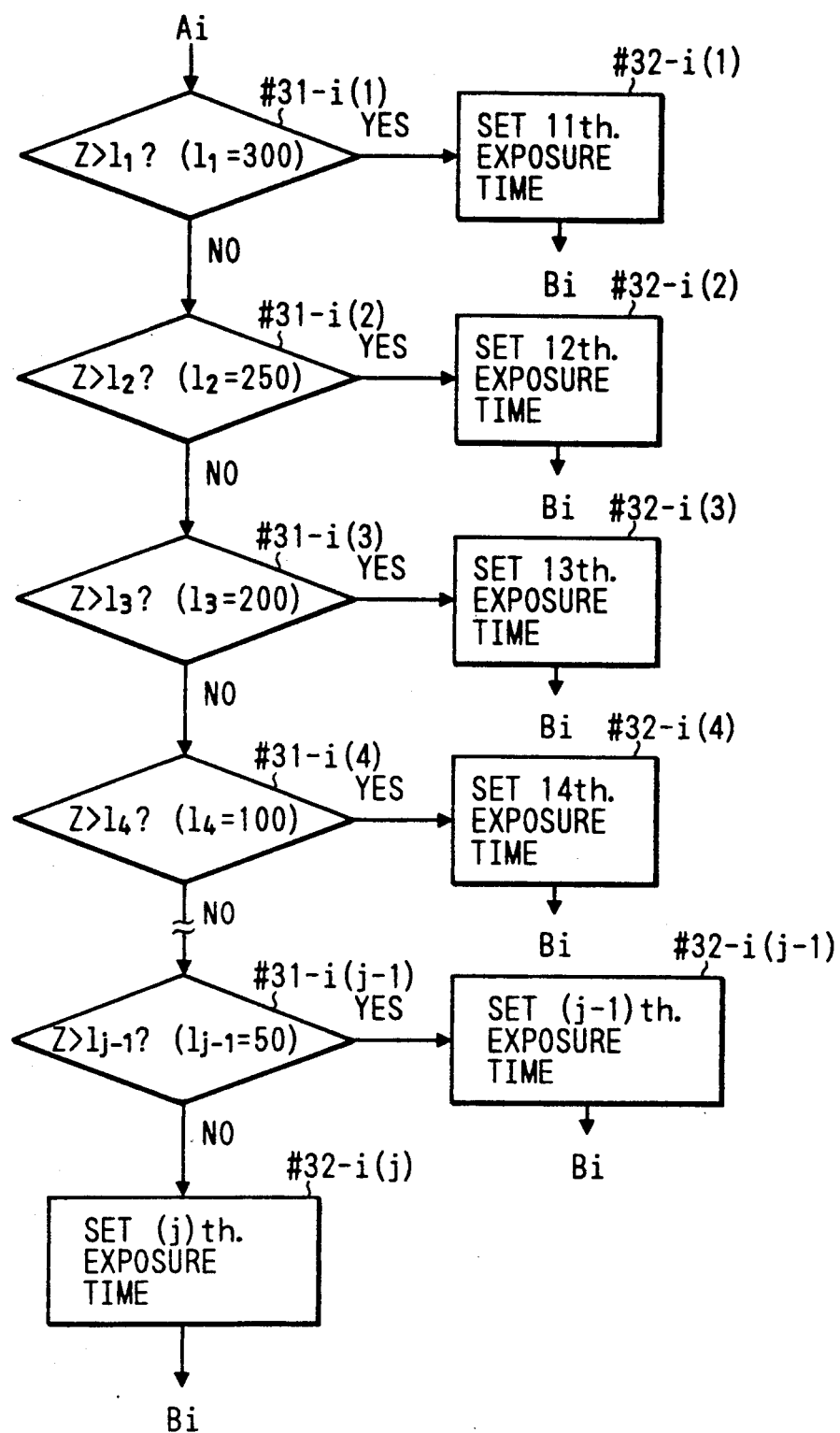

FIGS. 4A and 4B show the operation of a third embodiment of the present invention, and in FIGS. 4A and 4B, portions which perform the same operations as those in FIGS. 2 and 3 are given the same reference characters and the details thereof need not be described.

This embodiment is one designed such that the set exposure time is variable not only by lapse time, but also by zoom information Z.

In FIG. 4A, as in FIG. 3, the flow is made to branch off at the steps 21-1, 21-2, 21-3, ..., 21-n by lapse time, but as shown in FIG. 4B, the steps to which the flow has branched off are further made to branch off by the zoom information Z and exposure times are set.

This is because the image vibration on the surface of film by hand vibration is greatly varied by the focal length of the lens and for example, on the "300 mm" telephoto side, the slightest hand vibration results in an image-vibrated photograph, while on the "35 mm" wide angle side, the image vibration on the surface of the film is very small. The amount of image vibration $\delta$ on the surface of the film is formed from $$\delta = f \tan \theta,$$

where f is the focal length and $\theta$ is the angle of hand vibration, and in the present embodiment, this is based on the fact that if the angle of hand vibration is constant, the amount of image vibration $\delta$ increases as the focal length becomes greater.

Consequently, the image vibration on the surface of the film becomes small on the wide angle side, and the amplitude of vibration shown by a sine wave in FIG. 9 becomes small on the wide angle side. Therefore, the absolute amount of an error 814 also becomes small on the wide angle side.

In FIG. 4B, a flow Ai which has branched off from a step 21-i is input to a step 31-i(1), and if the focal length at this time is equal to or greater than $l_1$ (e.g. 300 mm), said flow branches off to a step 32-i(1), where an eleventh exposure time (e.g. 1/125 sec.) is set, and if said focal length is smaller than $l_1$, advance is made to a step 31-i(2). If likewise at this step 31-i(2), said focal length is equal to or greater than $l_2$ (e.g. 250 mm), said flow branches off to a step 32-i(2), where a twelfth exposure time (e.g. 1/100 sec.) is set, and if said focal length is smaller than $l_2$, advance is made to a step 31-i(3).

In this manner, judgment is repeated up to zoom settings $l_1$-$l_{j-1}$, and advance is made to above the output Bi thereof, i.e., a step 21-i-1.

If such a construction is adopted, when the focal length is within the commonly used range such as "50 mm", even when the output is unstable, the exposure time for image stabilization can be made long, and even in the case of a dark object, photographing can be effected at proper exposure.

If in the above-described construction, the chosen shutter speed and aperture or under-exposure are indicated on a viewfinder surface or the like to thereby inform the photographer of them, there will also result an advantage that the photographer can confirm that exposure situation and can judge the presence or absence of photographing.

Figure 5:
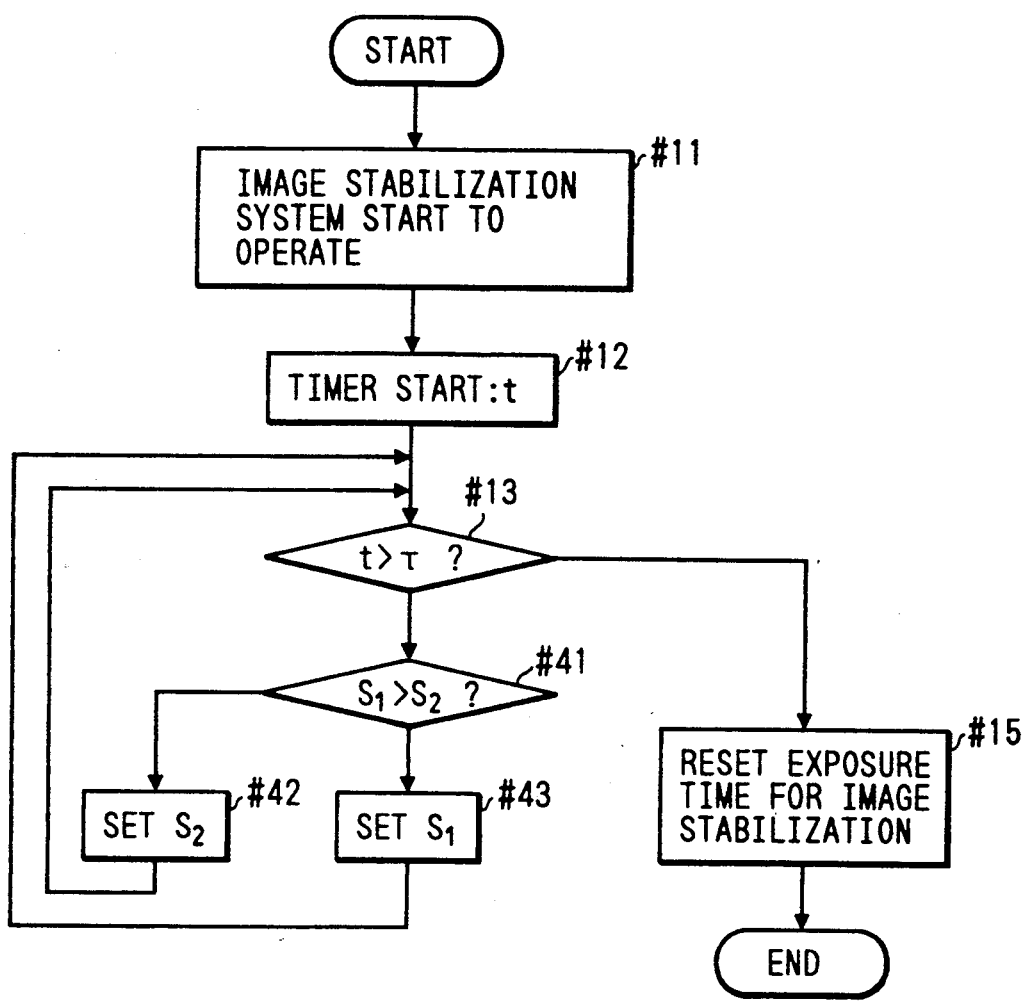
FIG. 5 is a flow chart showing the operation of a fourth embodiment of the present invention.

FIG. 5 shows the operation of a fourth embodiment of the present invention, and in FIG. 5, portions similar to those in FIG. 2 are given similar reference characters and the details thereof need not be described.

In the above-described first and second embodiments, the exposure time for image stabilization is forcibly set when the image stabilization output is unstable, while in this fourth embodiment, the exposure time intended by the photographer is also taken into account.

Let it be assumed, for example, that release has been effected when time has passed to a certain degree (when the image stabilization system is still unstable) after the operation of the image stabilization system is started. At this time, the shutter speed for image stabilization was "1/125 sec.". However, the shutter speed intended by the photographer is "1/300 sec.", i.e., shorter than the shutter speed for image stabilization, but nevertheless, in the aforedescribed first and second embodiments, photographing is forcibly effected at "1/125 sec.".

This fourth embodiment is designed such that in such a case, the shorter exposure time is chosen and set.

Therefore, in a camera having an image stabilization system, a photograph as intended by the photographer is easy to take even if photographing is started immediately after the operation of the image stabilization system is started, and in a normal condition (for example, fine weather and a 100 mm lens), photographing can be accomplished without the photographer feeling the burden resulting from the use of the image stabilization system.

In FIG. 5, let it be assumed that the exposure time for image stabilization is $S_1$ (e.g. 1/125 sec.) and the exposure time preset by an extraneous operation (a dial) or exposure information is $S_2$ (e.g. 1/300 sec.). In such case, if at the step 13, it is judged that the image stabilization output is still unstable, at a step 41, the shorter exposure time is selected, that is, advance is made to a step 42, where the exposure time $S_2$ is set.

If at this step 42, the exposure time $S_2$ is set, the flow may be intactly terminated, but with a case where the exposure time $S_2$ is changed when the image stabilization system is still unstable is taken into account, design is made such that return is made to above the step 13 still after said exposure time has been set.

Also, as in the first embodiment, after the lapse of a predetermined time, the flow branches off from the step 13 to a step 15, where the exposure time for image stabilization is released and the flow is terminated.

Of course, if design is made such that when the shutter speed set by the photographer is chosen, that fact is indicated within the viewfinder to inform the photographer that photographing as intended by the photographer is possible, there will be provided a camera with an image stabilizing function which is more convenient to the photographer.

Figure 6:
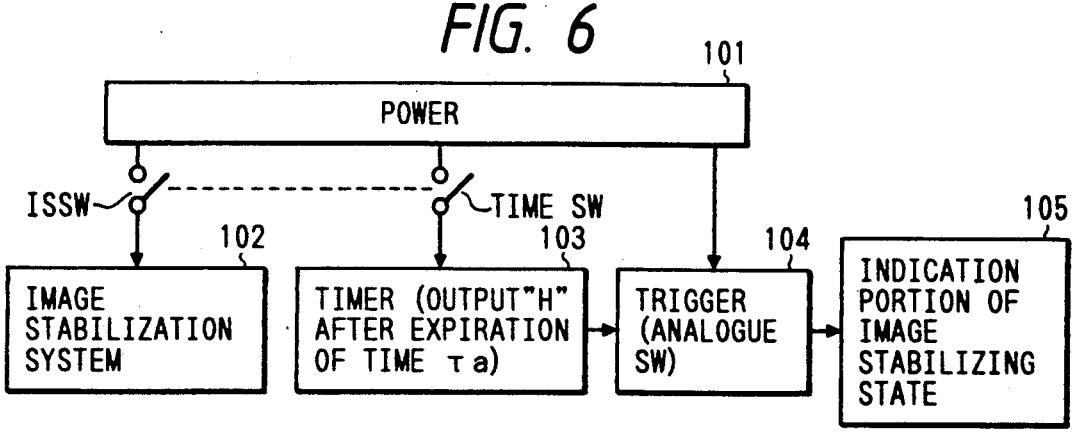
FIG. 6 is a block diagram showing a fifth embodiment of the present invention.
Figure 8:
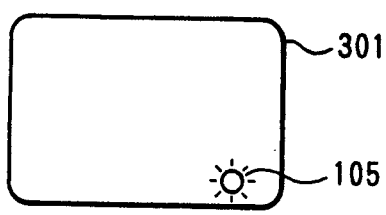
FIG. 8 shows the form of indication in the indicator of image stabilization state shown in FIG. 1.

Referring now to FIG. 6 which is a block diagram showing a camera provided with fifth embodiment of the present invention, the reference numeral 101 designates a power source, the reference numeral 102 denotes an image stabilization system comprising a construction as shown in FIG. 22 which starts the image stabilizing operation by an image stabilization switch ISSW being closed, and the reference numeral 103 designates a timer which starts counting by the closing of a timer switch TIME SW in synchronism with the image stabilization switch ISSW and outputs an "H" signal when a predetermined time $\tau a$ elapses. Since the image stabilization system becomes stable with time, this timer is detecting means for detecting the degree of stability of the image stabilization output. The reference numeral 104 denotes trigger means which produces a trigger signal by the "H" signal being input thereto, and the reference numeral 105 designates an indication portion of image stabilizing state disposed within a viewfinder 301 as shown in FIG. 8 for indicating the image stabilizing state by the trigger signal being input thereto.

Figure 7:
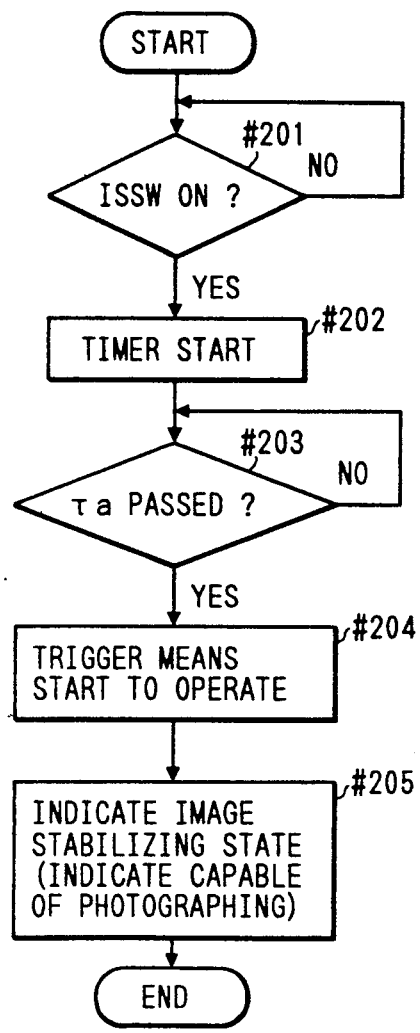
FIG. 7 is a flow chart showing the operation of the fifth embodiment.

The operation of the present embodiment will now be described with reference to the flow chart of FIG. 7.

Step 201

The image stabilization switch ISSW being closed by the photographer is waited for, and by this switch being closed, advance is made to a step 202.

Step 202

The timer switch TIME SW is also closed in synchronism with the image stabilization switch ISSW and therefore, the timer 103 is operated.

Step 203

At this step, the count value of the timer 103 exceeding a predetermined time $\tau_a$ (the time for which the output from the image stabilization system 102 is stabilized (e.g. ten times the integration time constant)) is waited for. By the count value of the timer 103 exceeding said predetermined time $\tau_a$, an "H" signal is output from the timer 103, and advance is made to a step 204.

Step 204

Since the "H" signal is input from the timer 103, the trigger means 104 is started and a trigger signal is output from the trigger means 104 to the indication portion of image stabilizing state 105, and advance is made to a step 205.

Step 205

Since the trigger signal is input from the trigger means 104, the indication portion of image stabilizing state 105 disposed in the view-finder 301 as shown in FIG. 8 is turned on, whereby a state capable of photographing is indicated to the photographer.

If such a construction is adopted, failure which will result from photographing being effected before the stabilization of the image stabilization output or the "missing of shutter chance" which will result from too long wait can be obviated.

In this fifth embodiment, design is made such that the indication portion of image stabilizing state 105 is turned on after the stabilization of the image stabilization output, whereas this is not restrictive, but various other methods would occur to mind, such as "the indication portion is turned on (for warning) until the stabilization of the image stabilization output, and is turned off after the stabilization," "the indication portion is turned on and off before the stabilization, and is turned on after the stabilization," and "a warning sound is produced before the stabilization, and no sound is produced after the stabilization."

FIG. 9 is a block diagram showing a camera provided with sixth embodiment of the present invention. In FIG. 9, the same portions as those in FIG. 6 are given the same reference numerals. This embodiment differs from the first embodiment in that the time until the image stabilization output is stabilized, i.e., the time until photographing becomes possible, is stepwise indicated.

Figure 11A:
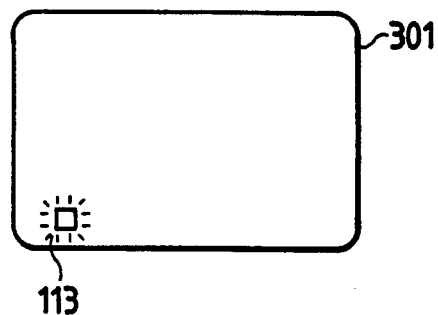
FIGS. 11A, 11B show the form of indication in the indicator of image stabilization state in the sixth embodiment.
Figure 11B:
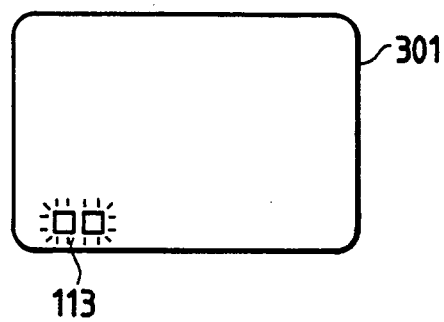
Figure 11C:
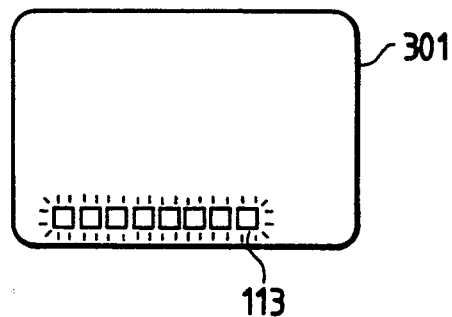

In FIG. 9, the reference numeral 111 designates a timer which starts counting by the closing of a timer switch TIME SW operated in synchronism with an image stabilization switch ISSW and output a timer time t normally varying moment by moment, the reference numeral 112 denotes a comparator which compares predetermined times $\tau_1$, $\tau_2$ and $\tau_3$ (which are in the relation that $\tau_1 < \tau_2 < \tau_3$, and $\tau_3$ is a time equal to the aforementioned predetermined time $\tau_a$) with the timer time t input from the timer 111, and outputs an "H" signal each time the timer time exceeds the respective predetermined times $\tau_1$, $\tau_2$ and $\tau_3$, and the reference numeral 113 designates an indicator of image stabilization state which stepwise indicate the state until photographing becomes possible as shown in FIGS. 11A, 11B and 11C each time a trigger signal is input from trigger means 104.

Figure 10:
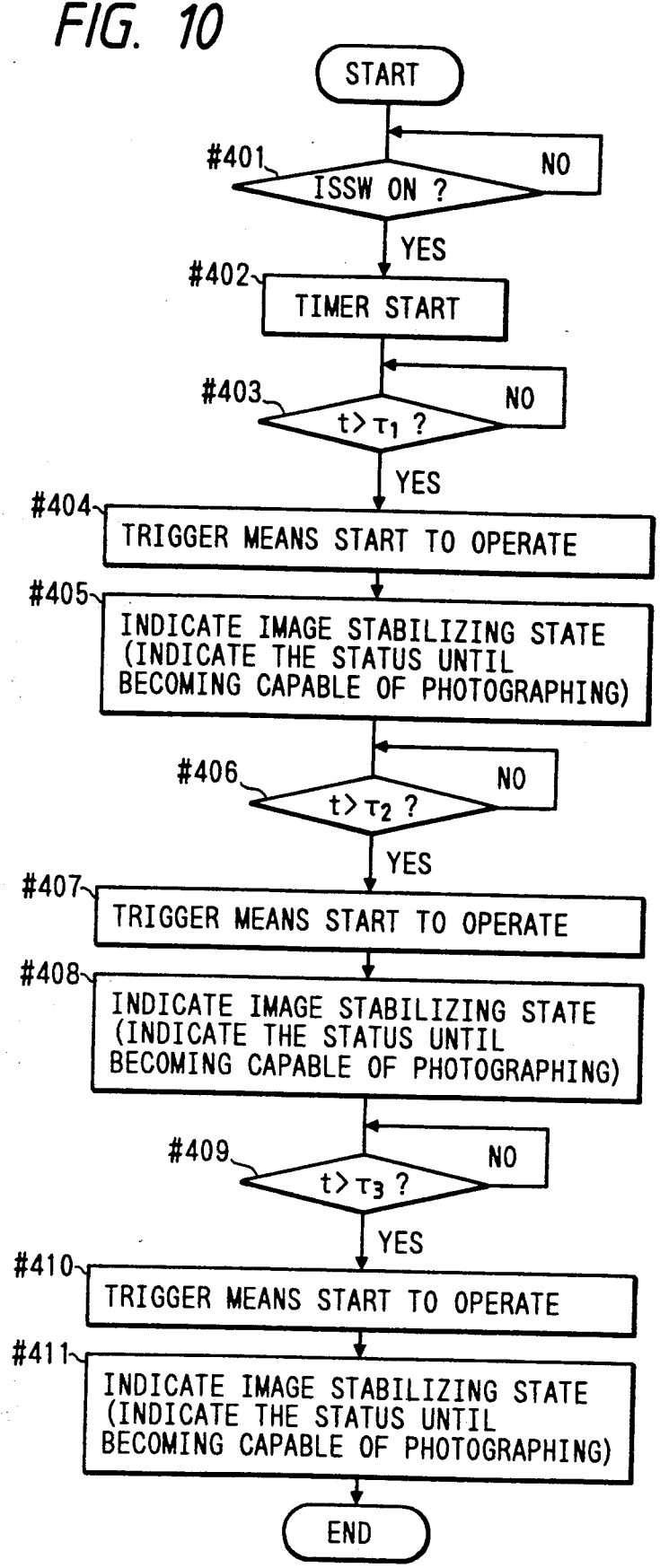
FIG. 10 is a flow chart showing the operation of the sixth embodiment.

The operation of the present invention will now be described with reference to the flow chart of FIG. 10.

Step 401

The image stabilization switch ISSW being closed by the photographer is first waited for, and by this switch being closed, advance is made to a step 402.

Step 402

The timer switch TIMESW is also closed in synchronism with the image stabilization switch ISSW and therefore, the timer 111 is operated.

Step 403

At this step, the count value of the timer 111 exceeding a first predetermined time $\tau_1$ is waited for. By the count value of the timer 111 exceeding the predetermined time $\tau_1$, an "H" signal is output from the timer 111, and advance is made to a step 404.

Step 404

Since the "H" signal is input from the timer 111, the trigger means 104 starts and a trigger signal is output from the trigger means 104 to the indicator of image stabilization state 113, and advance is made to a step 405.

Step 405

Since the trigger signal is input from the trigger means 104, a part of the indicator of image stabilization state 113 disposed in the viewfinder 301 as shown in FIG. 11A is turned on.

Step 406

At this step, the count value of the timer 111 exceeding a second predetermined time $\tau_2$ is waited for. By the count value of the timer 111 exceeding the predetermined time $\tau_2$, an "H" signal is output from the timer 111, and advance is made to a step 407.

Step 407

Since the "H" signal is input from the timer 111, the trigger means 104 starts, and a trigger signal is output from the trigger means 104 to the indicator of image stabilization state 113, and advance is made to a step 408.

Step 408

Since the trigger signal is input from the trigger means 104, a part (a number greater than the number of indications at the step 405) of the indicator of image stabilization state 113 is turned on as shown in FIG. 11B.

Step 409

At this step, the count value of the timer 111 exceeding a third predetermined time $\tau_3$ is waited for. By the count value of the timer 111 exceeding the predetermined time $\tau_3$, and "H" signal is output from the timer 111, and advance is made to a step 410.

Step 410

Since the "H" signal is input from the timer 111, the trigger means 104 starts and a trigger signal is output from the trigger means 104 to the indicator of image stabilization state 113, and advance is made to a step 411.

Step 411

Since the trigger signal is input from the trigger means 104, the whole of the indicator of image stabilization state 113 is turned on as shown in FIG. 11C. By the whole of this indicator being thus turned on, the photographer can know that a state capable of photographing has been brought about.

By adopting such a construction, the photographer is informed of the remaining waiting time and therefore, the photographer's mental burden is mitigated.

In this sixth embodiment, an indication form of the incremented type is adopted as shown in FIGS. 11A, B and C, but alternatively, an indication form of the decremental type or stepwise sounds or colors or a combination thereof may be adopted.

Figure 12:
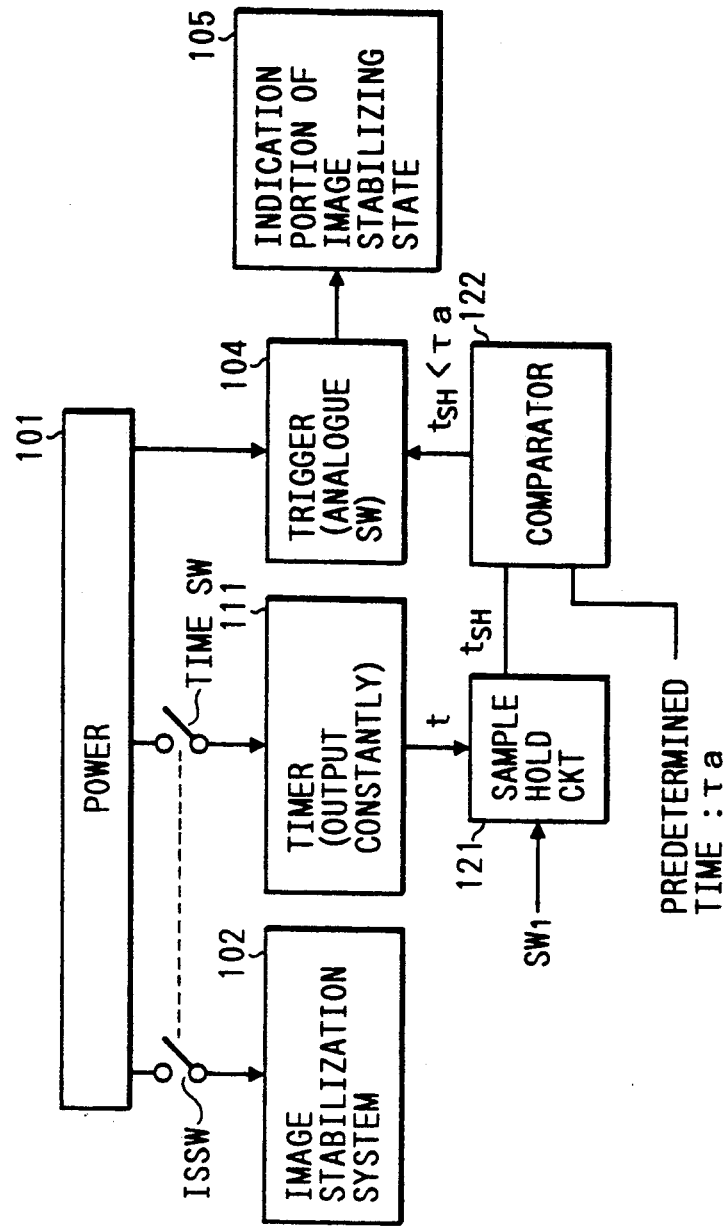
FIG. 12 is a block diagram showing a seventh embodiment of the present invention.

FIG. 12 is a block diagram showing a camera provided with seventh embodiment of the present invention. In FIG. 12, the same portions as those in FIGS. 6 and 10 are given the same reference numerals. This embodiment differs from the fifth and sixth embodiments in that the image stabilization state is indicated only when the release button is half-depressed.

In FIG. 12, the reference numeral 121 designates a sample hold circuit which holds the timer time t (the lapse time from after the image stabilization switch ISSW is closed) from the timer 111 at a point of time whereat a switch SW1 adapted to be closed by the half depression of the release button is closed, and the reference numeral 122 denotes a comparator which compares a sample time $t_{SH}$ output from the sample hold circuit 121 with the aforementioned predetermined time $\tau a$, and outputs an "H" signal as long as $t_{SH}$ and $\tau a$ are in the relation that $t_{SH} < \tau a$.

Figure 13:
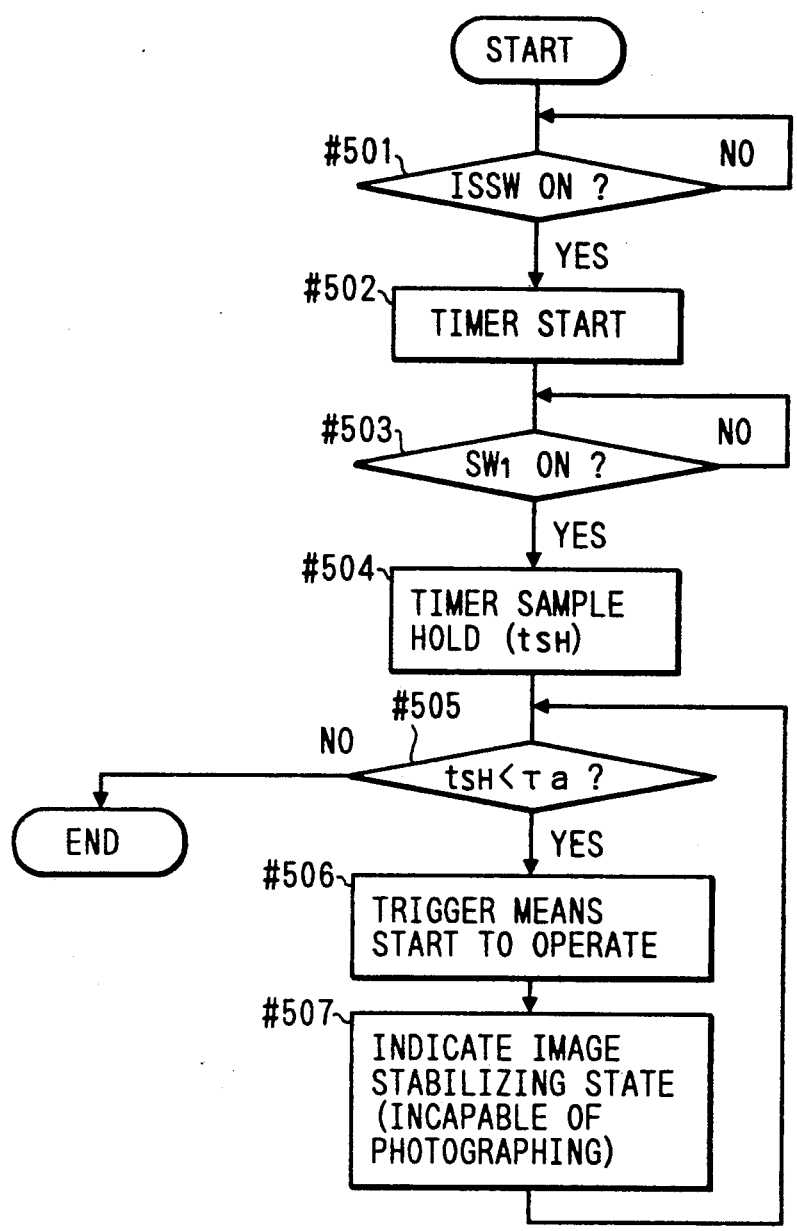
FIG. 13 is a flow chart showing the operation of the seventh embodiment.

The operation of the present embodiment will now be described with reference to the flow chart of FIG. 13.

Step 501

The image stabilization switch ISSW being closed by the photographer is first waited for, and by this switch being closed, advance is made to a step 502.

Step 502

Since the timer switch TIME SW is also closed in synchronism with the image stabilization switch ISSW, the timer 111 is operated.

Step 503

At this step, the release button is half-depressed, and the switch SW1 being closed is waited for, and by this switch being closed, advance is made to a step 504.

Step 504

Since the switch SW1 has been closed, the sampel hold circuit 121 immediately hold the current timer time as the sample time $t_{SH}$.

Step 505

At this step, the sample time $t_{SH}$ held by the sample hold circuit 121 is compared with the predetermined time $\tau a$, and as long as the result of the comparison is in the relation that $t_{SH} < \tau a$, an "H" signal is output from the comparator 122, and advance is made to a step 506.

On the other hand, if the result of the comparison is in the relation that $t_{SH} > \tau a$, that is, if the image stabilization output is stable, the indication of the image stabilization state (the indication of the impossibility of photographing) is not effected and this operation is terminated.

Step 506

Since the "H" signal is input from the comparator 122, the trigger means 104 starts and a trigger signal is output from the trigger means 104 to the indicator of image stabilization state 105, and advance is made to a step 507.

Step 507

Since the trigger signal is input from the trigger means 104, the indicator of image stabilization state 105 is turned on, and a state in which photographing is impossible (accuracy of photographing is low) is indicated to the photographer.

By adopting such a construction, the image stabilization state is indicated only when the photographer half-depresses the release button, and the indication is not effected in the other cases and therefore, not only cumbersomeness is eliminated, but also the indication period decreases extremely and therefore, the consumption of a battery can be prevented.

Figure 14:
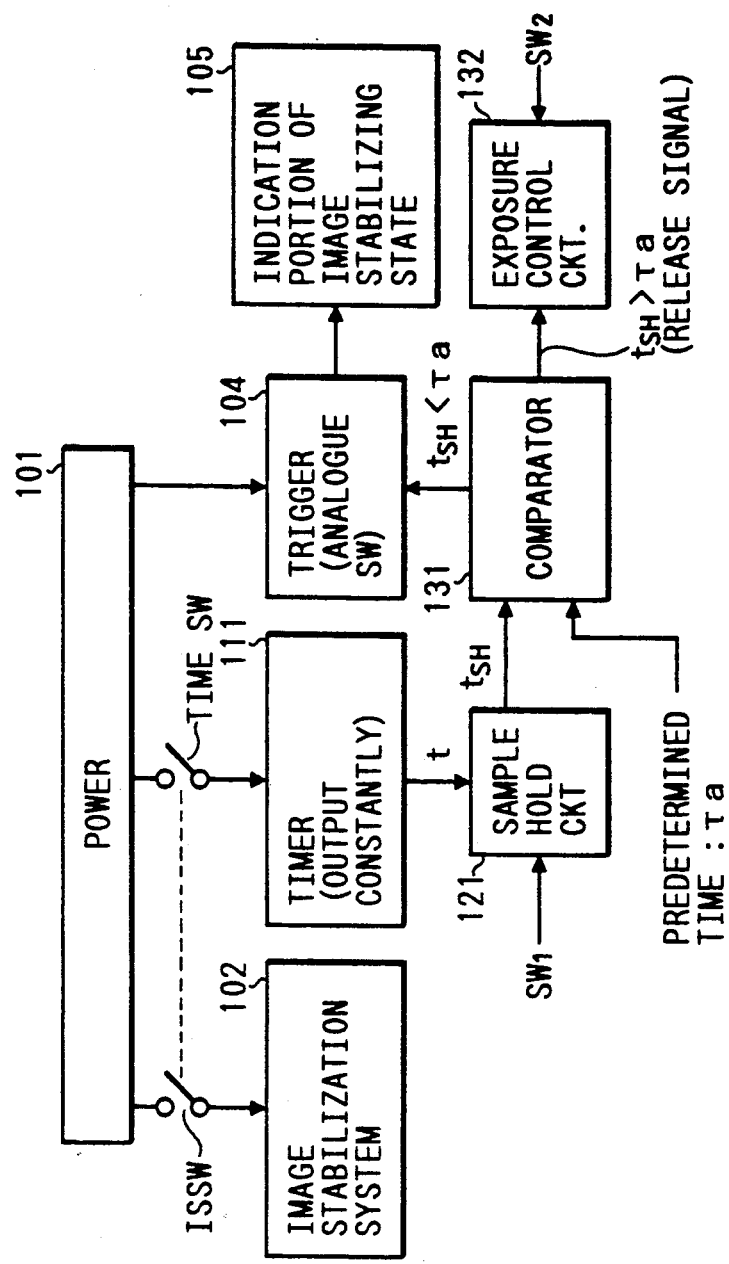
FIG. 14 is a block diagram showing an eighth embodiment of the present invention.

FIG. 14 is a block diagram showing a camera provided with eighth embodiment of the present invention. In FIG. 14, the same portions as those in FIG. 12 are given the same reference numerals.

This embodiment differs from the seventh embodiment in that the closing of the release switch SW2 is rejected to thereby prohibit the release operation until the image stabilization output is stabilized. More particularly, in the seventh embodiment, design is made such that the indication of the impossibility of photographing (the indication of the fact that accuracy of photographing is low) is effected as long as $t_{SH}$ and $\tau a$ are in the relation that $t_{SH} < \tau a$, and that even in such state, the closing of the release switch SW2 is accepted, whereas in this eighth embodiment, design is made such that the closing of the release switch SW2 is rejected unless $t_{SH}$ and $\tau a$ assume the relation that $t_{SH} > \tau a$.

In FIG. 14, the reference numeral 131 designates a comparator which compares the sample time $t_{SH}$ output from the sample hold circuit 121 with the aforementioned predetermined time $\tau a$ and outputs an "H" signal to the trigger circuit 104 and exposure control means which will be described later as long as $t_{SH}$ and $\tau a$ are in the relation that $t_{SH} < \tau a$, and the reference numeral 132 denotes exposure control means which rejects the closing of the release switch SW2 and prohibits the release operation (the exposure operation even if the release button is fully depressed) as long as the "H" signal is input from the comparator 131.

Figure 15:
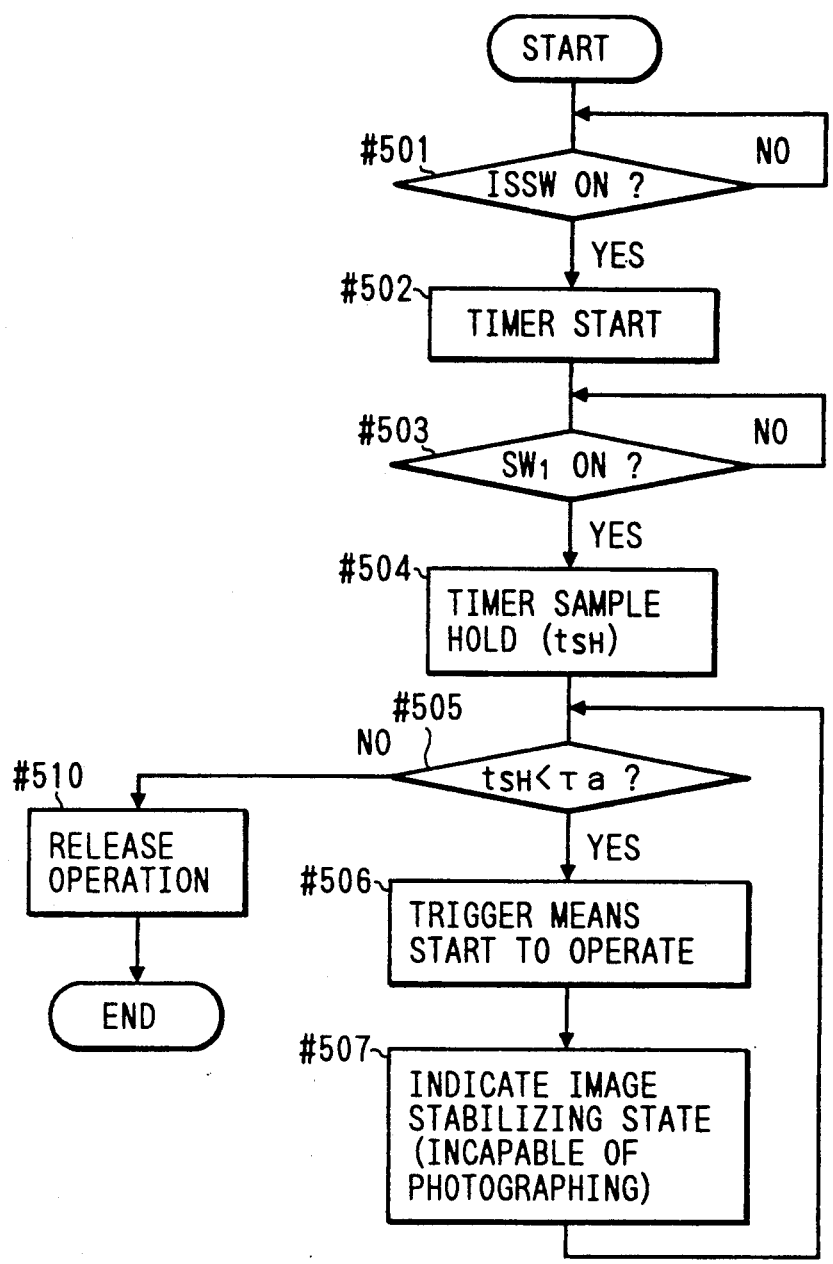
FIG. 15 is a flow chart showing the operation of the eighth embodiment.

The operation of the present embodiment will now be described with reference to the flow chart of FIG. 15, but here, only the portions differing from those of the seventh embodiment will be described.

At a step 505, the sample time $t_{SH}$ held by the sample hold circuit 121 is compared with the predetermined time $\tau a$, and as long as the result of the comparison is in the relation that $t_{SH} < \tau a$, an "H" signal is output from the comparator 122, and as in the seventh embodiment, advance is made to steps 506 and 507, where the indication of the image stabilization state (the indication of the impossibility of photographing) is effected. On the other hand, if the result of the comparison is in the relation that $t_{SH} > \tau a$, that is, if the image stabilization output is stable, the "H" signal output of the comparator 131 is stopped and therefore, the closing of the release switch SW2 is accepted, and the release operation becomes possible by a step 510.

By adopting such a construction, even if the photographer inadvertently performs the release operation, the release is prohibited until the image stabilization output is stabilized and therefore, there will result no unsuccessful photograph.

Figure 16:
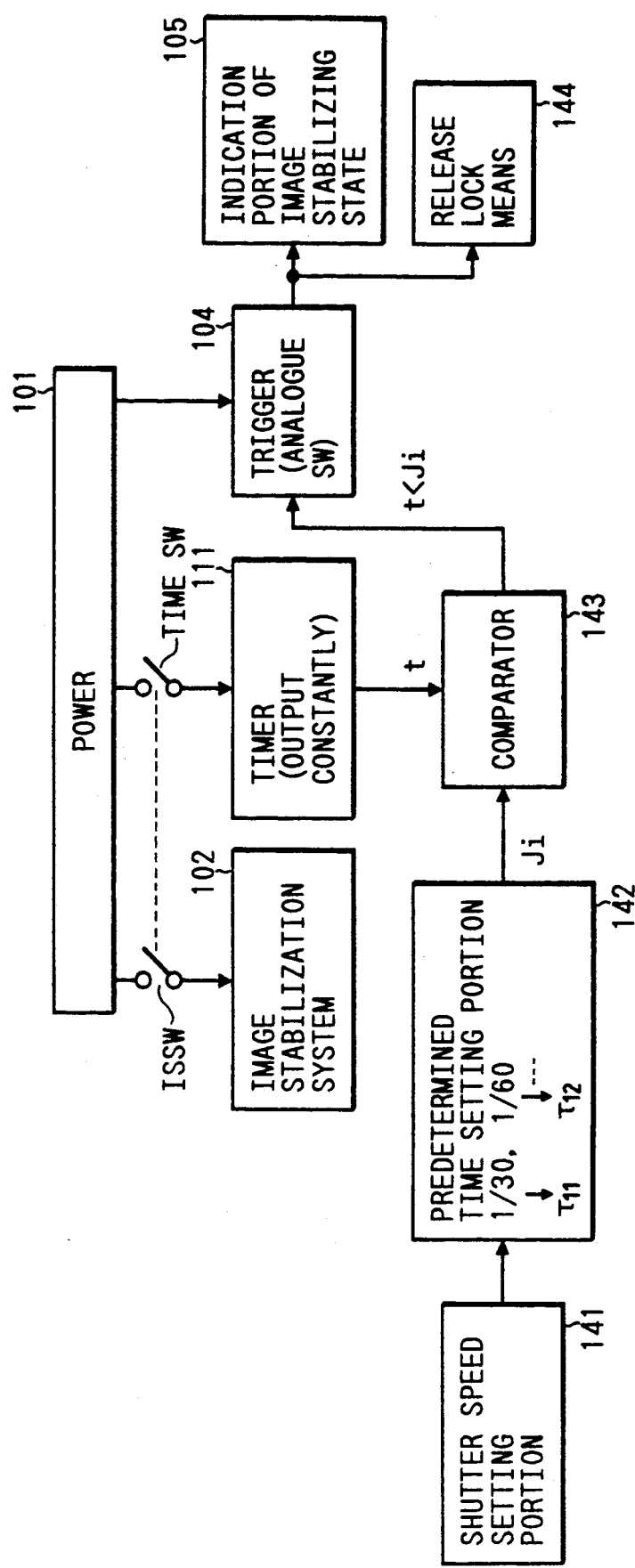
FIG. 16 is a block diagram showing a ninth embodiment of the present invention.

FIG. 16 is a block diagram showing a camera provided with a ninth embodiment of the present invention. In FIG. 16, the same portions as those in FIG. 14 are given the same reference numerals.

In the ninth embodiment, design is made such that a predetermined time $\tau i$ corresponding to the aforementioned predetermined time $\tau a$ is changed by a set shutter speed. This will now be described with reference again to FIG. 25.

Figure 25:
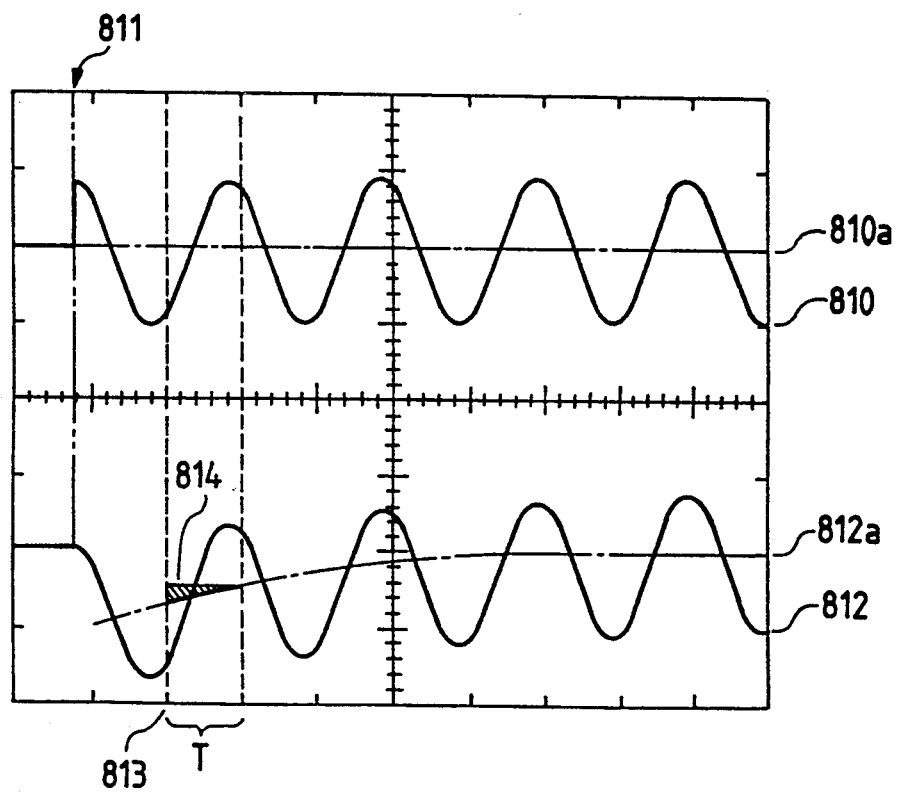
FIG. 25 is a graph showing the time until the stabilization of an image stabilization output when use is made of an integration circuit of the construction as shown in FIG. 24.

In FIG. 25, if the shutter speed T becomes shorter, the error 814 indicated by hatching will become smaller, and when for example, the lens is a "300 mm" lens and the shutter speed is "1/150", the error 814 is not so great even if the time from the image stabilization system operation (arrow 811) till exposure is 1 second or less, and no problem arises in the case of service size print. If likewise, an attempt is made to obtain the same degree of accuracy for shutter speeds "1/60" and "⅛", the waiting times will differ from each other. The predetermined time $\tau i$ is changed with this taken into account.

In FIG. 16, the reference numeral 141 designates a shutter speed setting portion for setting any shutter speed, the reference numeral 142 denotes a predetermined time setting portion for setting a predetermined time $\tau i$ ($\tau_{11}$, $\tau_{12}$, ...) which is an image stabilization output stabilization waiting time conforming to an input shutter speed, the reference numeral 143 designates a comparator which compares the timer time t from the timer 111 with the predetermined time $\tau i$, and outputs an "H" signal as long as t and $\tau i$ are in the relation that $t<\tau i$, and the reference numeral 144 denotes release lock means for prohibiting the release operation as long as a trigger signal is input from the trigger means 104.

Figure 17:
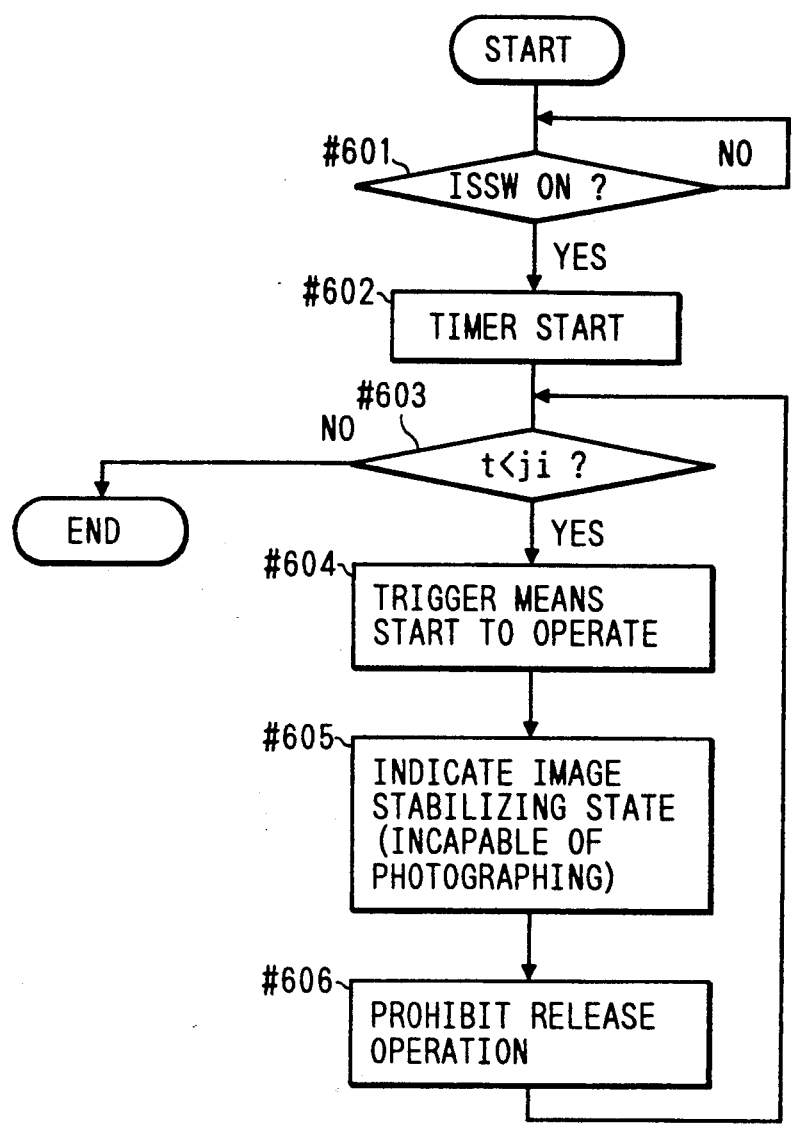
FIG. 17 is a flow chart showing the operation of the ninth embodiment.

The operation of the present embodiment will now be described with reference to the flow chart of FIG. 17.

Step 601

The image stabilization switch ISSW being closed by the photographer is first waited for, and by this switch being closed, advance is made to a step 602.

Step 602

Since the timer switch TIME SW is also closed in synchronism with the image stabilization switch ISSW, the timer 111 is operated.

Step 603

At this step, if the shutter speed set by the shutter speed setting portion 141 is e.g. "1/60", a predetermined time $\tau_{12}(\tau i)$ set by the predetermined time setting portion 142 is compared with the timer time t, and as long as the result of the comparison is in the relation that $t<\tau i$, an "H" signal is output from the comparator 143, and advance is made to a step 604.

On the other hand, if the result of the comparison is in the relation that $t>\tau i$, that is, if the image stabilization output is stable, this operation is terminated without the indication of the image stabilization state and the prohibition of the release operation being effected.

Step 604

Since the "H" signal is input from the comparator 143, the trigger means 104 starts and a trigger signal is output from the trigger means 104 to the indicator of image stabilization state 105, and advance is made to a step 605.

Step 605

Since the trigger signal is input from the trigger means 104, the indicator of image stabilization state 105 is turned on, whereby the state of impossibility of photographing is indicated to the photographer.

Step 606

Since the trigger signal is also input from the trigger means 104 to the release lock means 144, at this step, the release operation is prohibited by the means 144.

By adopting such a construction, the image stabilization output stabilization waiting time becomes variable by the set shutter speed and therefore, the waiting time is small for the commonly used shutter speed (of the order of "1/60"), and the opportunity of missing shutter chance becomes less often.

Figure 18:
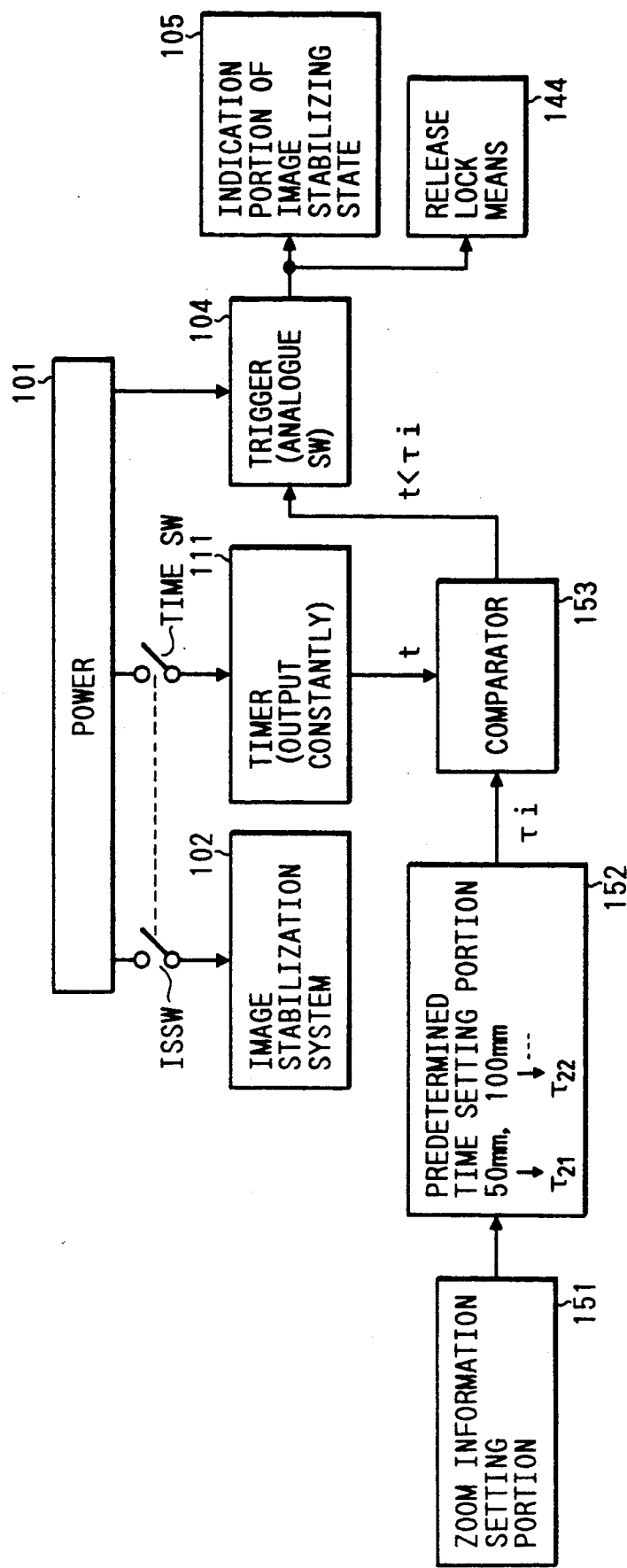
FIG. 18 is a block diagram showing a tenth embodiment of the present invention.

FIG. 18 is a block diagram showing a camera provided with tenth embodiment of the present invention. In FIG. 18, the same portions as those in FIG. 16 are given the same reference numerals. This embodiment differs from the ninth embodiment in that the shutter speed is replaced by zoom information.

In FIG. 18, the reference numeral 151 designates a zoom information setting portion for setting any zoom information, the reference numeral 152 denotes a predetermined time setting portion for setting a predetermined time $\tau i$ ($\tau_{21}$, $\tau_{22}$, ... ) which is an image stabilization output stabilization waiting time conforming to the input zoom information (when the zoom information is e.g. 50 mm, this predetermined time setting portion makes the predetermined time $\tau i$ shorter than when the zoom information is 300 mm, because the image deterioration by hand vibration becomes greater in a telephoto lens and the image deterioration by hand vibration becomes smaller toward the wide angle side), and the reference numeral 153 designates a comparator which compares the timer time t from the timer 111 with said predetermined time $\tau i$, and outputs an "H" signal as long as the result of the comparison is in the relation that $t<\tau i$.

Figure 19:
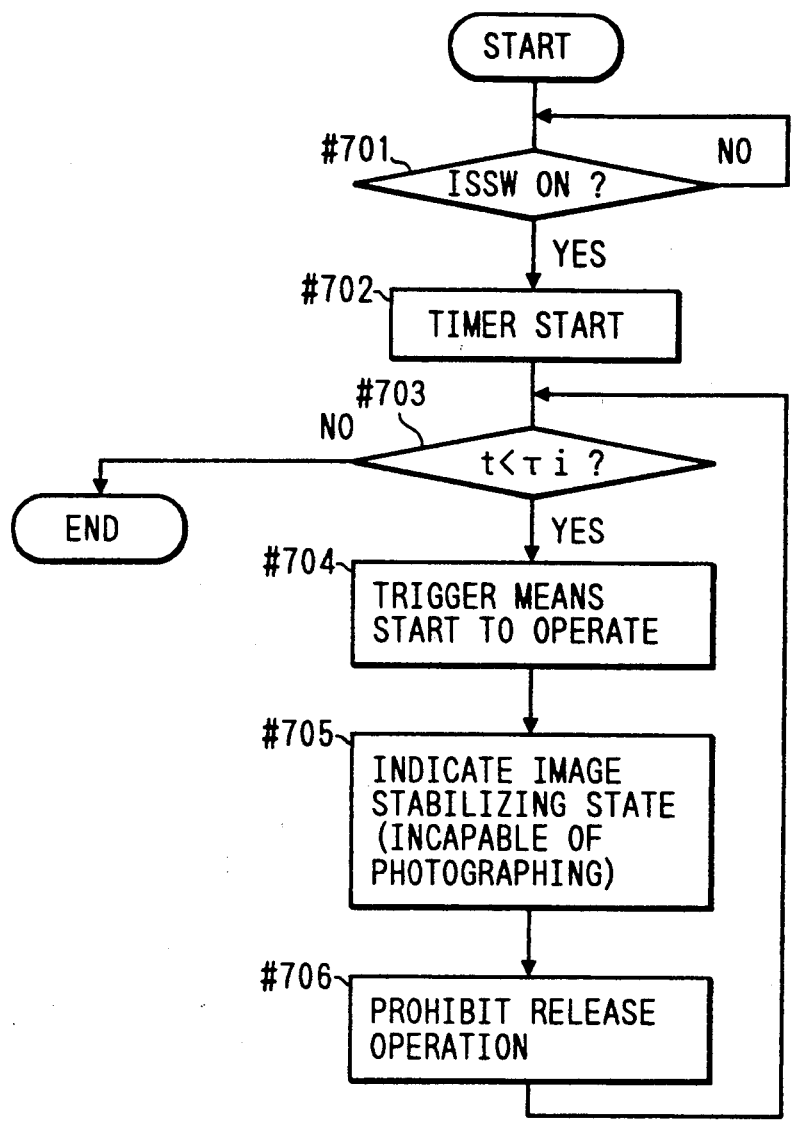
FIG. 19 is a flow chart showing the operation of the tenth embodiment.

The operation of the present embodiment will now be described with reference to the flow chart of FIG. 19.

Step 701

The image stabilization switch ISSW being closed by the photographer is first waited for, and by this switch being closed, advance is made to a step 702.

Step 702

The timer switch TIME SW is also closed in synchronism with the image stabilization switch ISSW and therefore, the timer 111 is operated.

Step 703

At this step, if the zoom information set by the zoom information setting portion 151 is e.g., "100 mm", a predetermined time $\tau_{22}$ ($\tau i$) set by the predetermined time setting portion 142 is compared with the timer time t, and as long as the result of the comparison is in the relation that $t<\tau i$, an "H" signal is output from the comparator 153, and advance is made to a step 704.

On the other hand, if the result of the comparison is in the relation that $t>\tau i$, that is, if the image stabilization output is stable, this operation is terminated without the indication of image stabilization state and the prohibition of the release operation being effected.

Step 704

Since the "H" signal is input from the comparator 153, the trigger means 104 starts, and a trigger signal is output from the trigger means 104 to the indicator of image stabilization state 105, and advance is made to a step 705.

Step 705

Since the trigger signal is input from the trigger means 104, the indicator of image stabilization state 105 is turned on, whereby the state of impossibility of photographing is indicated to the photographer.

Step 706

Since the trigger signal is also input from the trigger means 104 to the release lock means 144, at this step, the release operation is prohibited by the means 144.

By adopting such a construction, the image stabilization output stabilization waiting time becomes variable by the set zoom information and therefore, during the use of a commonly used zoom lens, the waiting time is smaller than during the use of a long-focus lens, and the opportunity of missing shutter chance becomes less often.

Figure 20:
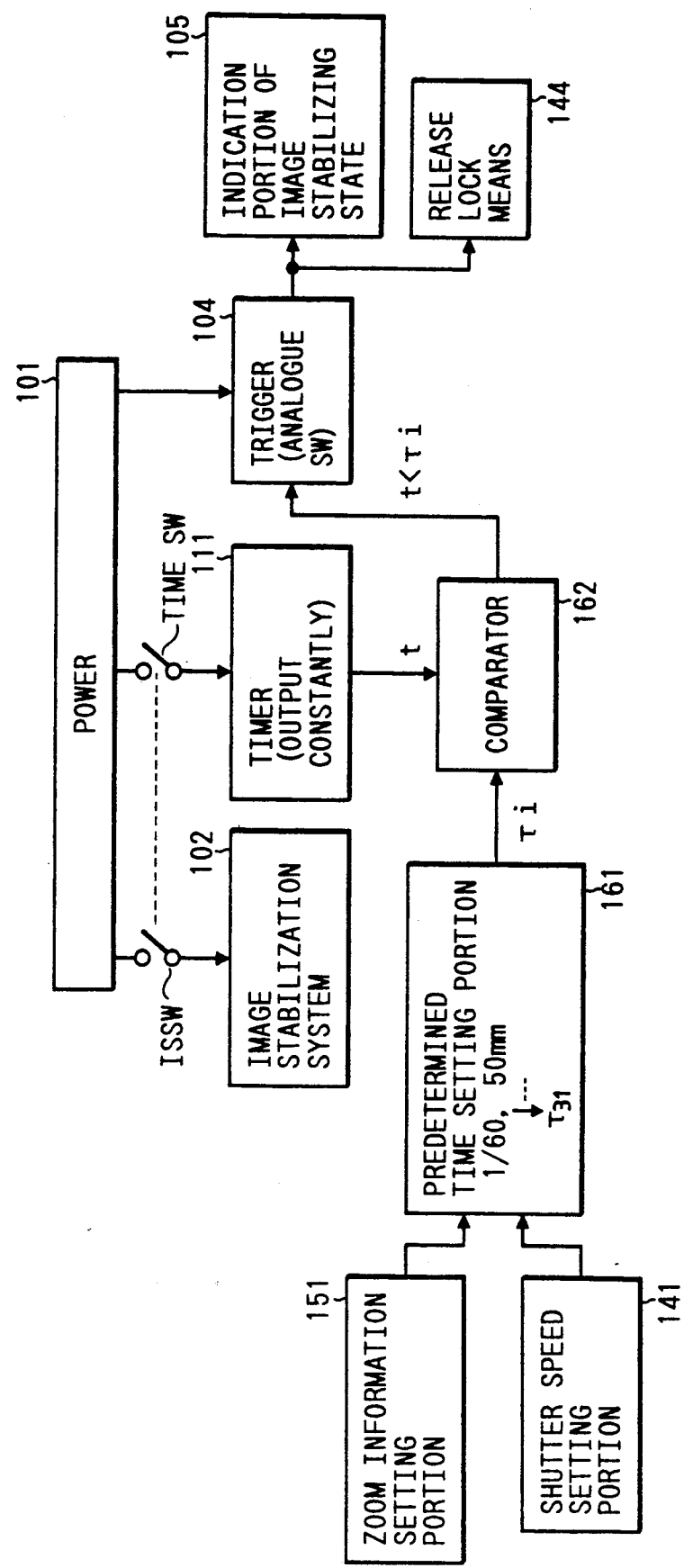
FIG. 20 is a block diagram showing an eleventh embodiment of the present invention.

FIG. 20 is a block diagram showing a camera provided with eleventh embodiment of the present invention. In FIG. 20, the same portions as those in FIGS. 16 and 18 are given the same reference characters. This embodiment is of a construction comprising a combination of the ninth embodiment and the tenth embodiment, i.e., a construction in which with both of the shutter speed and zoom information taken into consideration, the predetermined time $\tau i$ which is the image stabilization output stabilization waiting time is made variable.

In FIG. 20, the reference numeral 161 designates a predetermined time setting portion for setting a predetermined time $\tau i$ ($\tau_{31}$, ..) conforming to the set zoom information and the set shutter speed, and the reference numeral 162 denotes a comparator which compares the timer time t from the timer 111 with said predetermined time $\tau i$, and outputs an "H" signal as long as the result of the comparison is in the relation that $t<\tau i$.

Figure 21:
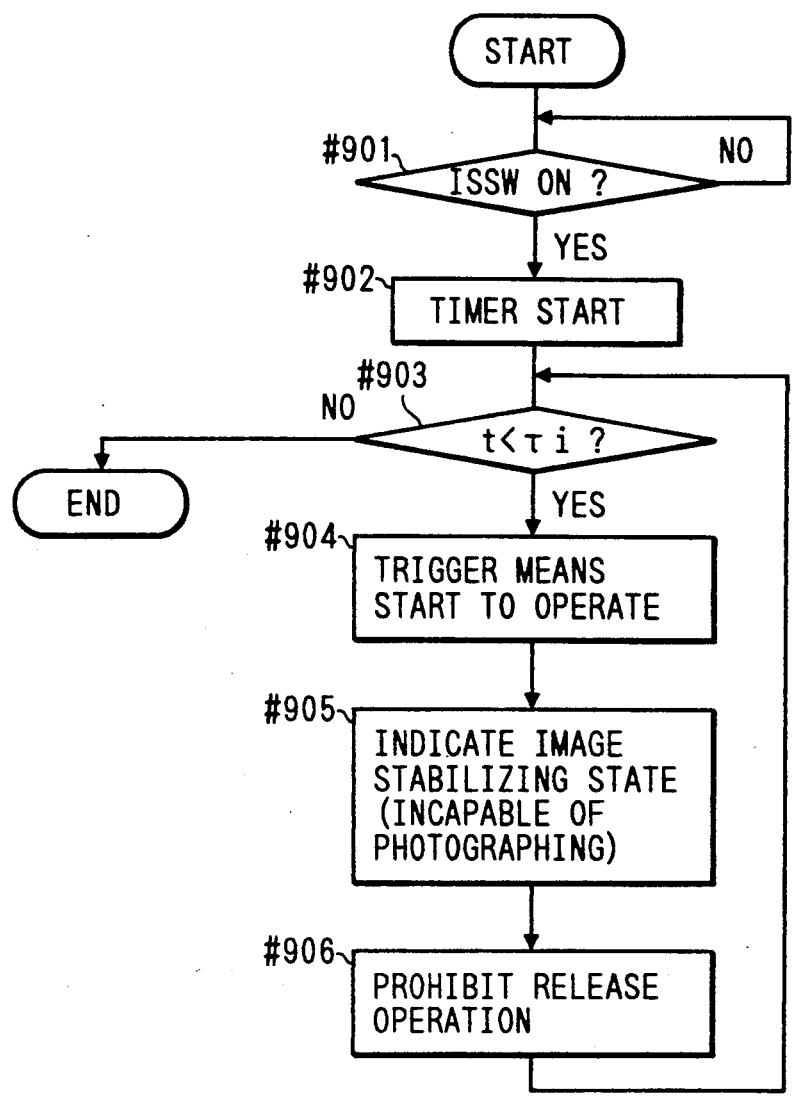
FIG. 21 is a flow chart showing the operation of the eleventh embodiment.

The operation of the present embodiment will now be described with reference to the flow chart of FIG. 21.

Step 901

The image stabilization switch ISSW being closed by the photographer is first waited for, and by this switch being closed, advance is made to a step 902.

Step 902

Since the timer switch TIME SW is also closed in synchronism with the image stabilization switch ISSW, the timer 111 is operated.

Step 903

At this step, a predetermined time $\tau i$ set in conformity with the zoom information and the shutter speed set by the zoom information setting portion 151 and the shutter speed setting portion 141, respectively, is compared with the timer time t, and as long as the result of the comparison is in the relation that $t<\tau i$, an "H" signal is output from the comparator 162, and advance is made to a step 904.

On the other hand, if the result of the comparison is in the relation that $t>\tau i$, that is, if the image stabilization output is stable, this operation is terminated without the indication of image stabilization state and the prohibition of the release operation being effected.

Step 904

Since the "H" signal is input from the comparator 162, the trigger means 104 starts and a trigger signal is output from the trigger means 104 to the indicator of image stabilization state 105, and advance is made to a step 905.

Step 905

Since the trigger signal is input from the trigger means 104, the indicator of image stabilization state 105 is turned on, whereby the state of impossibility of photographing is indicated to the photographer.

Step 906

Since the trigger signal is also input from the trigger means 104 to the release lock means 144, at this step, the release operation is prohibited.

By adopting such a construction, when for example, the shutter speed is "1/60 mm" and the zoom information is "50 mm", hand vibration is considerably small and therefore, the predetermined time $\tau i$ is set to a very short time by the predetermined time setting portion 161, and during the actual common use (about 1/60 mm and about 50 mm), there is very little waiting time and the photographer is not made to be conscious of the image stabilization mechanism being contained.

As described above, according to the first to third embodiments, design is made such that the exposure time (shutter speed) for image stabilization is used as long as the image stabilization system is unstable and therefore, failure in photographing (image stabilization error blurring) can be eliminated and further, by that exposure time being varied by the degree of stability of the image stabilization system and the zoom information, even a case where the object is dark or even a lens of a long focal length can be coped with.

Also, according to the fourth embodiment, when the exposure time set by the photographer is shorter than the exposure time for image stabilization, the former exposure time is selected and therefore, it has become possible to take a photograph faithful to the photographer's intention even when the image stabilization output is unstable.

Also, according to the fifth to eleventh embodiments, design is made such that the photographer can recognize the stable state of the image stabilization output (the hand vibration detection output) by turn-on, turn-on-and-off or sound and therefore, the problem of failing in photographing or missing shutter chance becomes less often, and failure in photographing can be more reliably eliminated in a construction wherein release is locked until the image stabilization output becomes stable.

Further, in a construction wherein the predetermined time $\tau i$ until the image stabilization output becomes stable is variable by the set shutter speed and zoom information, it has become possible to operate the camera during the common use (1/60 mm, 50 mm, etc.) without the photographer being made conscious of the fact that the image stabilization system is contained (without any waiting time).

In the above-described embodiments, an angular speed meter is taken as an example which requires time before the image stabilization output becomes stable, whereas the present invention is not restricted thereto, but is applicable to various image stabilization systems such as cameras having an image stabilization system using an inertia sensor which likewise requires time before the image stabilization output becomes stable (for example, a sensor using an inertia frame as disclosed in Japanese Patent Application No. 1-296106).

Of course, the above-described embodiments may be suitably combined.

Also it should be noted that the present invention is not restricted to the embodiment described above but applicable to various types of applications.

What is claimed is:

1. An image stabilization device, comprising:
   (A) vibration detecting means for detecting blur of an image, said vibration detecting means reaching a stable state after expiration of a predetermined time period;
   (B) vibration correcting means responsive to said vibration detecting means to correct a blur of the image; and
   (C) control means for alerting when said vibration detecting means is in an unstable state.

2. The device of claim 1, wherein said control means includes means for stepwise indicating the degree of stability of said vibration detecting means.

3. The device of claim 1, wherein said control means includes means for acting in response to the depression of a shutter release button.

4. The device of claim 1, wherein said control means includes means for acting in response to a first stroke of a shutter release button.

5. The device of claim 1, wherein said control means includes varying means for varying the action time of said control means in conformity with shutter speed or focal length.

6. The device of claim 5, wherein said varying means includes means for shortening the action time of said control means in response to the shutter speed becoming higher.

7. The device of claim 5, wherein said varying means includes means for lengthening the action time of said control means in response to the focal length becoming longer.

8. The device of claim 1 further comprising time counting means for counting the time until the operation of said vibration detecting means reaches said stable state.

9. The device of claim 8, wherein said control means continuously alerts until the predetermined time at which the operation of said vibration detecting means reaches said stable state.

10. The device of claim 9, wherein said control means varies said predetermined time in accordance with shutter speed or focal length.

11. An image stabilization device, comprising:
    (A) vibration detecting means for detecting blur of an image, said vibration detecting means reaching a stable state after expiration of a predetermined time period;
    (B) vibration correcting means responsive to said vibration detecting means to correct a blur of the image; and
    (C) control means for restricting photographing operation in accordance with the state of stability of said vibration detecting means.

12. The device of claim 11, wherein said control means includes prohibiting means for prohibiting the photographing operation as long as the operation of said vibration detecting means is unstable.

13. The device of claim 11, wherein said control means includes varying means for varying the action time of said control means in conformity with shutter speed or focal length.

14. The device of claim 13, wherein said varying means includes means for shortening the action time of said control means in response to the shutter speed becoming higher.

15. The device of claim 13, wherein said varying means includes means for lengthening the action time of said control means in response to the focal length becoming longer.

16. The device of claim 11, wherein said control means includes means for acting in response to the depression of a shutter release button.

17. The device of claim 11, wherein said control means includes means for acting in response to a first stroke of a shutter release button.

18. The device of claim 11 further comprising time counting means for counting the time until the operation of said vibration detecting means reaches said stable state.

19. The device of claim 18, wherein said control means continues to restrict the photographing operation until the time counting of said time counting means reaches the predetermined time at which said vibration detecting means reaches said stable state.

20. The device of claim 18, wherein said control means varies said predetermined time in accordance with shutter speed or focus length.

21. An image stabilization device, comprising:
    (A) vibration detecting means for detecting blur of an image, said vibration detecting means reaching a stable state after expiration of a predetermined time period;
    (B) vibration correcting means responsive to said vibration detecting means to correct a blur of the image; and
    (C) control means for varying a shutter speed in accordance with stability of said vibration detecting means.

22. The device of claim 21, wherein said control means includes shifting means for shifting the shutter speed to a high shutter speed side as long as the operation of said vibration detecting means is unstable.

23. The device of claim 22, wherein said control means includes means for shifting the shutter speed stepwise to a low shutter speed side as said vibration detecting means becomes stable.

24. The device of claim 22, wherein said shifting means includes means for varying the shifted shutter speed in conformity with focal length.

25. The device of claim 24, wherein said shifting means includes means for varying shutter speed to a high shutter speed side in response to focal length becoming longer.

26. The device of claim 22, wherein said control means includes means for giving priority to a shutter speed set on the camera side when the shutter speed set on the camera side when the shutter speed set on the camera side is higher than the shutter speed shifted by said control means.

27. The device of claim 21, further comprising time counting means for counting the time until the operation of said vibration detecting means becomes stable.

28. The device of claim 27, wherein said control means shifts the shutter speed to a high shutter speed side until said time counting means counts the predetermined time at which the operation of said vibration detecting means becomes stable.

29. The device of claim 21, wherein said control means shifts the shutter speed to a low shutter speed side in accordance with stability of said vibration detecting means and focal length.

30. An image stabilization device, comprising:
 (A) vibration detecting means for detecting blur of an image, said vibration detecting means reaching a stable state after expiration of a predetermined time period;
 (B) vibration correcting means responsive to said vibration detecting means to correct a blur of the image; and
 (C) outputting means for outputting a signal representing that the operation of said vibration detecting means is unstable.

31. A device according to claim 30, further comprising alarm means for alerting in accordance with the output signal of said outputting means.

32. A device according to claim 30, further comprising restricting means for restricting a photographing operation in accordance with the output signal of said outputting means.

33. A device according to claim 30, further comprising varying means for varying shutter speed in accordance with the output signal of said outputting means.

34. A camera, comprising:
 (A) vibration detecting means for detecting blur of an image, said vibration detecting means reaching a stable state after expiration of a predetermined time period;
 (B) vibration correcting means responsive to said vibration detecting means to correct a blur of the image; and
 (C) control means for alerting when said vibration detecting means is in an unstable state.

35. The camera of claim 34, wherein said control means includes means for stepwise indicating the degree of stability of said vibration detecting means.

36. The camera of claim 34, wherein said control means includes means for acting in response to a first stroke of a shutter release button.

37. The camera of claim 34, further comprising time counting means for counting the time until the operation of said vibration detecting means reaches said stable state.

38. The camera of claim 37, wherein said control means continuously alerts until the predetermined time at which the operation of said vibration detecting means reaches said stable state.

39. A camera, comprising:
 (A) vibration detecting means for detecting blur of an image, said vibration detecting means reaching a stable state after expiration of a predetermined time period;
 (B) vibration correcting means responsive to said vibration detecting means to correct a blur of the image; and
 (C) control means for restricting photographing operation in accordance with the state of stability of said vibration detecting means.

40. The camera of claim 39, wherein said control means includes prohibiting means for prohibiting the photographing operation as long as the operation of said vibration detecting means is unstable.

41. The camera of claim 39, wherein said control means includes varying means for varying the action time of said control means in conformity with shutter speed or focal length.

42. The camera of claim 39, wherein said control means includes means for acting in response to a first stroke of a shutter release button.

43. The camera of claim 39 further comprising time counting means for counting the time until the operation of said vibration detecting means reaches said stable state.

44. A camera, comprising:
 (A) vibration detecting means for detecting blur of an image, said vibration detecting means reaching a stable state after expiration of a predetermined time period;
 (B) vibration correcting means responsive to said vibration detecting means to correct a blur of the image; and
 (C) control means for varying a shutter speed in accordance with stability of said vibration detecting means.

45. The camera of claim 44, wherein said control means includes shifting means for shifting the shutter speed to a high shutter speed side as long as the operation of said vibration detecting means is unstable.

46. The camera of claim 44, further comprising time counting means for counting the time until the operation of said vibration detecting means becomes stable.

47. The camera of claim 46, wherein said control means shifts the shutter speed to a high shutter speed side until said time counting means counts the predetermined time at which the operation of said vibration detecting means becomes stable.

* * * * *

UNITED STATES PATENT AND TRADEMARK OFFICE
CERTIFICATE OF CORRECTION

PATENT NO. : 5,245,378
DATED : September 14, 1993
INVENTOR(S) : Koichi Washisu

It is certified that error appears in the above-indentified patent and that said Letters Patent is hereby corrected as shown below:

Col. 3, line 50.  After "11B" insert -- and 11C --
Col. 4, lines 29-30.  Change "T, becomes" to -- T becomes, --
Col. 4, line 61.  Change "or computer" to -- of a micro-computer --
Col. 7, lines 20, 23, 25, 28, 30.  Change "1" to -- $\ell$ --
Col. 9, line 29.  After "long" insert -- a --
Col. 9, line 34.  Change "occur" to -- come --
Col. 11, line 55.  Change "sampel" to -- sample --
Col. 11, line 56.  Change "hold" to -- holds --
Col. 14, line 23.  After "missing" insert -- a --
Col. 15, line 31.  After "missing" insert -- a --

UNITED STATES PATENT AND TRADEMARK OFFICE
CERTIFICATE OF CORRECTION

PATENT NO. : 5,245,378
DATED : September 14, 1993
INVENTOR(S) : Koichi Washisu

It is certified that error appears in the above-indentified patent and that said Letters Patent is hereby corrected as shown below:

Column 16, line 60, after "missing" insert --a--.

Signed and Sealed this

Twenty-sixth Day of April, 1994

Attest:

BRUCE LEHMAN

Attesting Officer      Commissioner of Patents and Trademarks